United States Patent [19]
Itoh

[11] Patent Number: 5,805,465
[45] Date of Patent: Sep. 8, 1998

[54] OPERATOR SUPPORT SYSTEM

[75] Inventor: Toru Itoh, Hyogo, Japan

[73] Assignee: Mitsubishi Denki Kabushiki Kaisha, Tokyo, Japan

[21] Appl. No.: 567,226

[22] Filed: Dec. 5, 1995

[30] Foreign Application Priority Data

Dec. 6, 1994 [JP] Japan .................................. 6-302376

[51] Int. Cl.$^6$ .............................. G05B 9/02; G05B 23/02
[52] U.S. Cl. .............. 364/551.01; 364/552; 364/468.01; 395/912
[58] Field of Search .............................. 364/551.01, 552, 364/554, 921.4, 921.9, 148, 184, 468.01; 395/155, 133, 912

[56] References Cited

U.S. PATENT DOCUMENTS

| 4,115,848 | 9/1978 | Kogure et al. ......................... | 364/107 |
| 5,315,502 | 5/1994 | Koyama et al. ........................ | 364/185 |
| 5,423,000 | 6/1995 | Kimura et al. ......................... | 395/200 |
| 5,452,439 | 9/1995 | Makino .................................. | 395/155 |
| 5,513,308 | 4/1996 | Mori ...................................... | 395/155 |

FOREIGN PATENT DOCUMENTS

| 0235958 | 8/1987 | European Pat. Off. ........ G06F 15/74 |
| 0280553 | 8/1988 | European Pat. Off. ........ G21C 17/00 |
| 716364 | 12/1996 | European Pat. Off. ........ G05B 23/02 |
| 2013229 | 1/1990 | Japan . |

OTHER PUBLICATIONS

X. Gandibleux e al., "Decision Support System to . . . System", Oct. 17, 1993, 1993, Inter. Conf. . . . Cybernetics, vol. 1, Le Touquet, Fr., pp. 459–464.

Primary Examiner—Emanuel T. Voeltz
Assistant Examiner—Shah Kaminis
Attorney, Agent, or Firm—Rothwell, Figg, Ernst & Kurz

[57] ABSTRACT

An operator support system comprises an operation guidance generating unit 14 for displaying operation procedures to an operator on the basis of plant monitoring data, and a running operation evaluation processing unit 23 for comparing control object equipment and operation contents of a guidance table generated by the operation guidance generating unit 14 with operation contents selected by the operator and output through an operation selecting unit 22, and for evaluating that the operation contents are correct by coincidence thereof, to prevent an operator's operation error. Accordingly, the operator support system which is capable of evaluating whether or not the operation contents performed by an operator is adequate, and, if an inadequate running operation is performed, of informing the operator of an error without outputting that control output to the controlled plant.

20 Claims, 23 Drawing Sheets

GUIDANCE TABLE 143

| | |
|---|---|
| 143a | NO.1 GUIDANCE STATEMENT |
| 143b | NO.1 CONTROL OBJECT EQUIPMENT CODE |
| 143c | NO.1 OPERATION CONTENTS CODE/SET VALUE |
| 143d | NO.1 OPERATION COMPLETION FLAG |
| | NO.2 GUIDANCE STATEMENT |
| | NO.2 CONTROL OBJECT EQUIPMENT CODE |
| | NO.2 OPERATION CONTENTS CODE/SET VALUE |
| | NO.2 OPERATION COMPLETION FLAG |
| | ⋮ |
| | NO.n GUIDANCE STATEMENT |
| | NO.n CONTROL OBJECT EQUIPMENT CODE |
| | NO.n OPERATION CONTENTS CODE/SET VALUE |
| | NO.n OPERATION COMPLETION FLAG |

FIG.4A

SELECTION DATA 222

| | |
|---|---|
| CONTROL OBJECT EQUIPMENT CODE | 222a |
| OPERATION CONTENTS CODE/SET VALUE | 222b |

FIG.4B

161 — EXAMPLE OF GUIDANCE DISPLAY SCREEN
- OPENING OPERATION OF WATER SUPPLY CONTROL VALVE B — G1
- TURNING ON OF HEATER C — G2
- ACTIVATION OF PUMP K — G3
FIG.6A
162 — EXAMPLE OF OPERATION SELECTION SCREEN
OPENING/CLOSING CONTROL OF WATER SUPPLY CONTROL VALVE
A     B     C
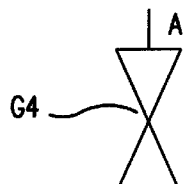  
G4
  
G5
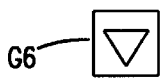  
G6
FIG.6B

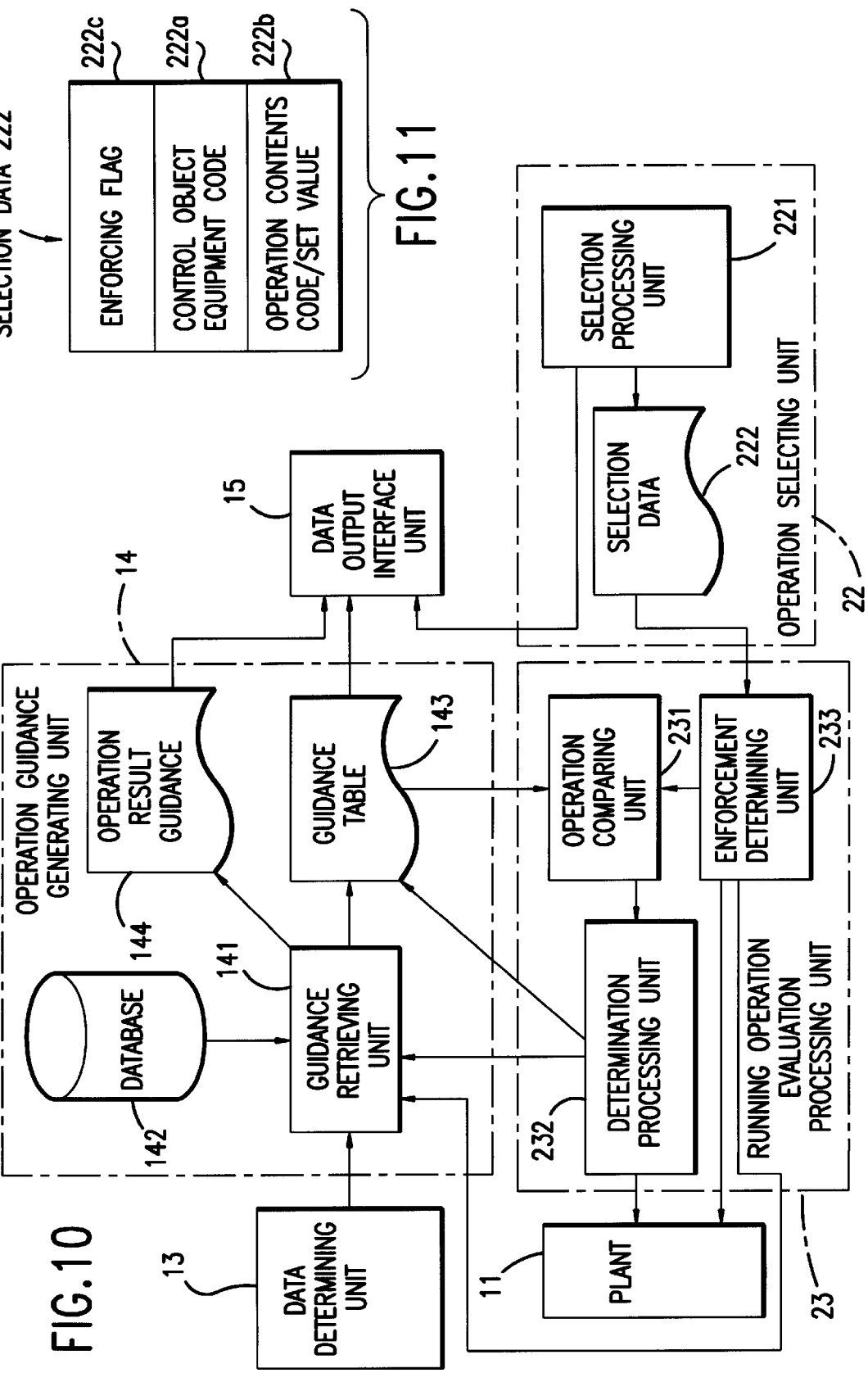

GUIDANCE TABLE 143

| | |
|---|---|
| 143a | NO.1 GUIDANCE STATEMENT |
| 143b | NO.1 CONTROL OBJECT EQUIPMENT CODE |
| 143c | NO.1 OPERATION CONTENTS CODE/SET VALUE |
| 143f | NO.1 TIME DATA |
| 143g | NO.1 TURN DETERMINING FLAG |
| 143d | NO.1 OPERATION COMPLETION FLAG |
| | NO.2 GUIDANCE STATEMENT |
| | NO.2 CONTROL OBJECT EQUIPMENT CODE |
| | NO.2 OPERATION CONTENTS CODE/SET VALUE |
| | NO.2 TIME DATA |
| | NO.2 TURN DETERMINING FLAG |
| | NO.2 OPERATION COMPLETION FLAG |
| | ⋮ |
| | NO.n GUIDANCE STATEMENT |
| | NO.n CONTROL OBJECT EQUIPMENT CODE |
| | NO.n OPERATION CONTENTS CODE/SET VALUE |
| | NO.n TIME DATA |
| | NO.n TURN DETERMINING FLAG |
| | NO.n OPERATION COMPLETION FLAG |

FIG.21

OPERATOR SUPPORT SYSTEM

FIELD OF THE INVENTION

The present invention relates to an operator support system designed to output an operation guidance information from monitoring data, to evaluate the contents of an operator's operation according to the guidance information and prevent an erroneous operation which the operator might otherwise make, thereby to enable supervisory control of control equipment, particularly a large scale plant, such as a nuclear, thermal or hydraulic power plant, an electric power system plant, an iron and steel plant, a chemical plant or a water treatment plant.

DESCRIPTION OF THE RELATED ART

Monitoring and control of large scale complex plants impose a great burden on the operator, and thus an operator support system for such plants is required to lighten the mental burden imposed on the operator and to secure safety.

FIG. 24 illustrates a conventional operator support system disclosed in, for example, Japanese Patent Laid-Open No. Hei 4-289418. In FIG. 24, plant 1 is a monitor and control object run by a computer program. A plant data collecting unit 2 collects monitoring data from the plant 1. A data processing unit 3 processes the collected monitoring data. A running operation guide processing unit 4 provides running operation guide data on the basis of the data processed by the data processing unit 3. A man-machine interface processing unit 5 displays the guide data provided by the running operation guide processing unit 4 on CRTs 7 and 8, and provides necessary data for the operator by retrieving it from a database 6 corresponding to an input from the CRT for dialog with the operator.

The operation guide processing unit 4 determines the state of the plant 1 on the basis of the plant monitoring data input through the data processing unit 3, and displays the contents to be performed by the operator in predetermined procedures on the CRTs 7 and 8 through the man-machine interface processing unit 5 as guidance to the operator. In response to that guidance display, the operator selects the contents to be executed from a touch panel provided on the CRTs 7 and 8. The selected contents are output to the plant through the main-machine interface processing unit 5.

Since the conventional operator support system is configured as described above, the operation contents to be performed by the operator are displayed merely as a guidance and are thus provided to the operator in order to assist the operator in making a decision. However, since the system has no function for guarding the plant from operations which the operator may select erroneously, there is a risk that the operations which the operator has selected by careless mistake will be transmitted to the plant, thereby causing a serious accident in the plant.

Such erroneous operations may be suppressed to a certain extent if the plant is automated. However, the final decision must be often made manually, and the risk that an erroneous operation will be made on operations that cannot be automated cannot be eliminated completely.

SUMMARY OF THE INVENTION

The present invention is directed to solving the above-described problems. It is an object of the invention to provide a running operation support system which is designed to evaluate whether or not the operation contents which the operator has selected are adequate.

It is another object of the invention to point out an operation error to the operator without outputting that selected control operation to the plant, if an inadequate or improper running operation is selected.

An operator support system according to the invention comprises: an operation guidance generating unit for outputting, from monitoring data, operation contents in the form of guidance of operations to be performed by an operator; an operation selecting unit for outputting operation contents selected by the operator according to the guidance; and an operation evaluation unit for comparing data representing the operation contents of the guidance with data representing the operation contents outputted by the operation selecting unit and for evaluating that the operation contents selected by the operator are correct when correspondence is obtained between the data, and for sending the operation contents selected by the operator as control output for execution.

In another embodiment, an operator support system according to the invention comprises: an operation guidance generating unit for outputting, from monitoring data, a plurality of operation contents of operations to be performed by an operator in the form of a guidance table; an operation selecting unit for outputting operation contents selected by the operator according to the guidance table; and an operation evaluation unit for comparing data representing each of the operation contents recorded in the guidance table with data representing the operation contents outputted by the operation selecting unit, for evaluating that the operation contents selected by the operator are correct when the operation evaluation unit determines, from coincidence in a particular portion of the data, that correspondence is obtained between the data, and for sending the operation contents selected by the operator as control output for execution.

In still another embodiment of an operator support system for enabling an operator to monitor and control a monitor and control object run by a computer program, the system according to the invention comprises: a data collecting unit for collecting monitoring data from the monitor and control object; an operation guidance generating unit for generating operation contents to be conducted by the operator as guidance data on the basis of the monitoring data; an output interface connected to operation guidance generating unit; an output device connected to output interface for informing the operator of said guidance data; an input device for allowing the operator to input monitor and control data on the monitor and control object corresponding to the guidance data; an input interface connected to the input device; an operation selecting unit connected to the input interface for outputting data representing operation contents selected by the operator from the input monitor control data; and a running operation evaluating unit for comparing the guidance data from the operation guidance generating unit with the data from the operation selecting unit, representing the operation contents selected by the operator, for evaluating that the operation contents selected by the operator are correct when correspondence is obtained between the two data, and for sending the data selected by the operator to the monitor and control data as control output, wherein the data selected by the operator is outputted to the output device through the output interface with information being supplied to the operator.

Other objects and advantages of this invention will become apparent from the detailed description given hereinafter. It should be understood, however, that the detailed description and specific embodiment are provided by way of illustration only since various changes and modifications within the spirit and scope of the invention will become apparent to the those skilled in the art from the detailed description.

BRIEF DESCRIPTION OF THE DRAWINGS

FIGS. 4(A) and 4(B) illustrate data contents of the operator support system according to embodiment 1 of the invention.

FIGS. 6(A) and 6(B) illustrate a screen display example of the operator support system according to embodiment 1 of the invention.

FIG. 10 illustrates the essential parts of the operator support system according to embodiment 3 of the invention.

FIG. 11 illustrates data contents of the operator support system according to embodiment 3 of the invention.

FIG. 21 illustrates data contents of the operator support system according to embodiment 6 of the invention.

In all figures, the same and substantially the same elements are designated by the same reference numbers.

DESCRIPTION OF PREFERRED EMBODIMENTS

Embodiment 1

Figure 1:
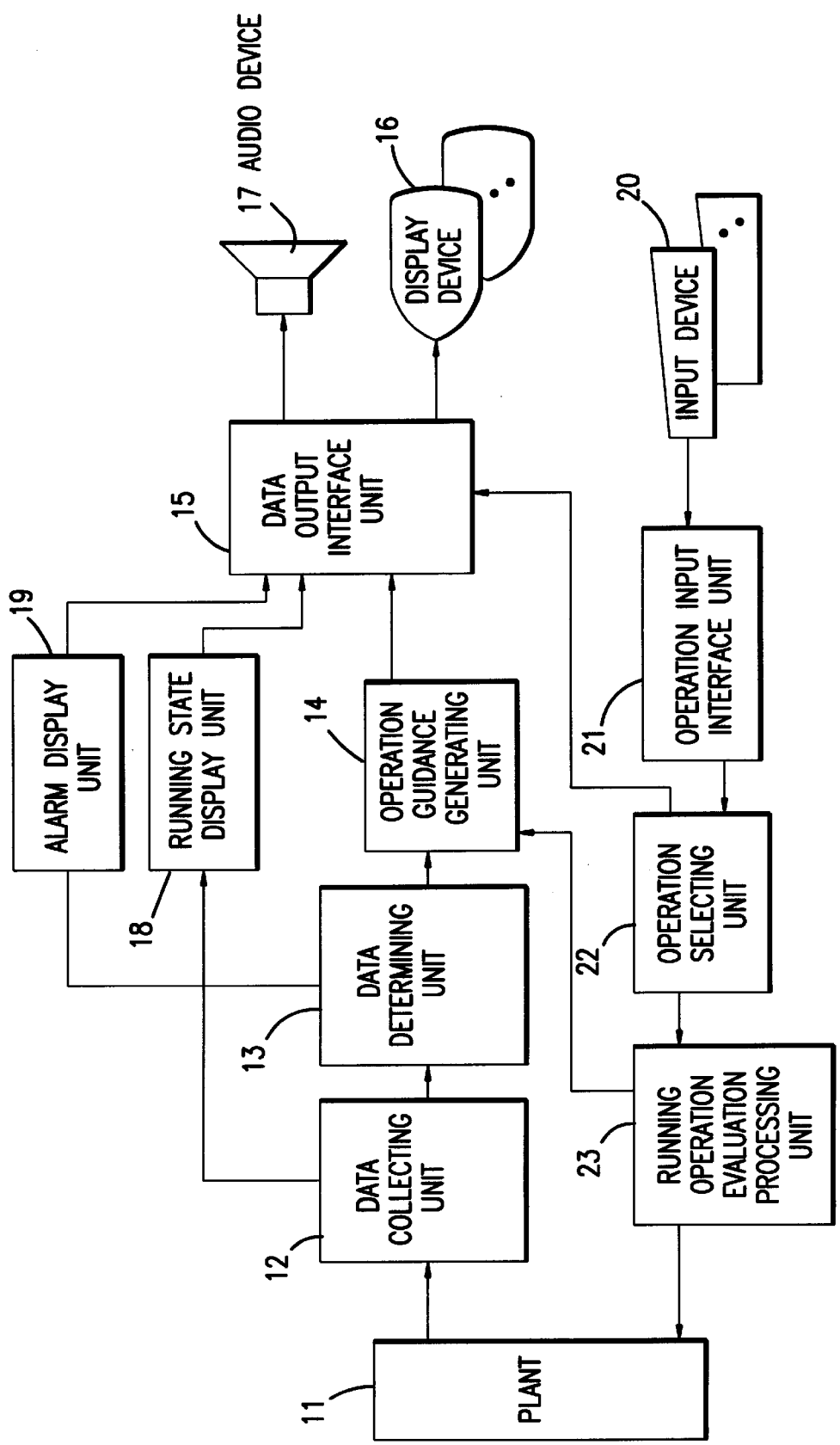
FIG. 1 is a complete block diagram of an operator support system common to all embodiments of the invention set forth.

FIG. 1 is a schematic view of a running operation support system according to an embodiment of the invention. In FIG. 1, a plant 11 is to be a monitor and control object which requires a running operation support system. Examples of such a plant 11 include a nuclear, thermal or hydraulic power plant, an electric power system plant, an iron and steel plant, a chemical plant and a water treatment plant, each of which is a large scale plant operated under a computer program control and monitored by an operator. A data collecting unit 12 collects monitoring data from the plant 11. A data determining unit 13 determines an abnormal state of the plant for the output of operation guidance to be provided to the operator on the basis of the monitoring data collected by the data collecting unit 12. An operation guidance generating unit 14 generates, as guidance data, a guidance table in which necessary operation guidances are listed in the order of operation upon receipt of a request for generation of operation guidance from the data determining unit 13. A data output interface unit 15 outputs data to be informed of the operator, such as the operation procedures based on the guidance table, to a display device 16 or an audio device 17 which serve as output devices. A running state display unit 18 informs the operator of the plant running state data collected by the data collecting unit 12 through the data output interface unit 15. An alarm display unit 19 issues an alarm to inform the operator of the contents of an abnormality when the data determining unit 13 determines an abnormality of the plant.

An input device 20 may be a touch panel or a switch board which the operator directly touches and operates the contents as displayed on the display device 16. An operation selecting unit 22 receives, from the input device, the equipment selected by the operator and the operation contents for that equipment, and outputs selection data representing the contents of the operation to be selected for the plant. A running operation evaluation processing unit 23 compares the operation contents output from the operation selecting unit 22 with the operation contents recorded in the guidance table generated by the operation guidance generating unit 14, and thereby evaluates the contents of the operation selected by the operator.

The operation of the operator support system shown in FIG. 1 will be described with reference to FIG. 2. In step S101, the data collecting unit 12 periodically collects monitoring data on the plant 11. Next, the data determining unit 13 determines in step S102 whether an abnormal state of the plant exists, and then determines whether or not a guidance step prepared in the plant operator support system in advance is performed in step S103. If a guidance step is to be performed, the guidance generating unit 14 generates a guidance table by designating the guidance items in step S104.

The operation contents output in the guidance table are displayed as operation guidance data on the display device 16 monitored by the operator through the data output interface unit 15. When the operator selects the equipment to be operated and the operation contents for that equipment (which may be switch on or switch off, automatic operation or manual operation or opening or closing, or which may be a set value in the case of analog equipment) by operating the input device 20 and determining whether or not the operation thereof is made in step S105 according to the guidance display, the operation selecting unit 22 edits the selected operation contents as the selection data in step S106. In step S107, the running operation evaluation processing unit 23 compares the selected operation contents with the operation contents recorded in the guidance table. Thereafter, in step S108, it is determined whether the selected operation contents are coincident with the recorded operation contents. If they are coincident (YES), the control output corresponding to the coincided operation contents is outputted to the plant 11 in step S109. If they are not coincident (NO), no control operation is outputted to the plant 11.

Figure 2:
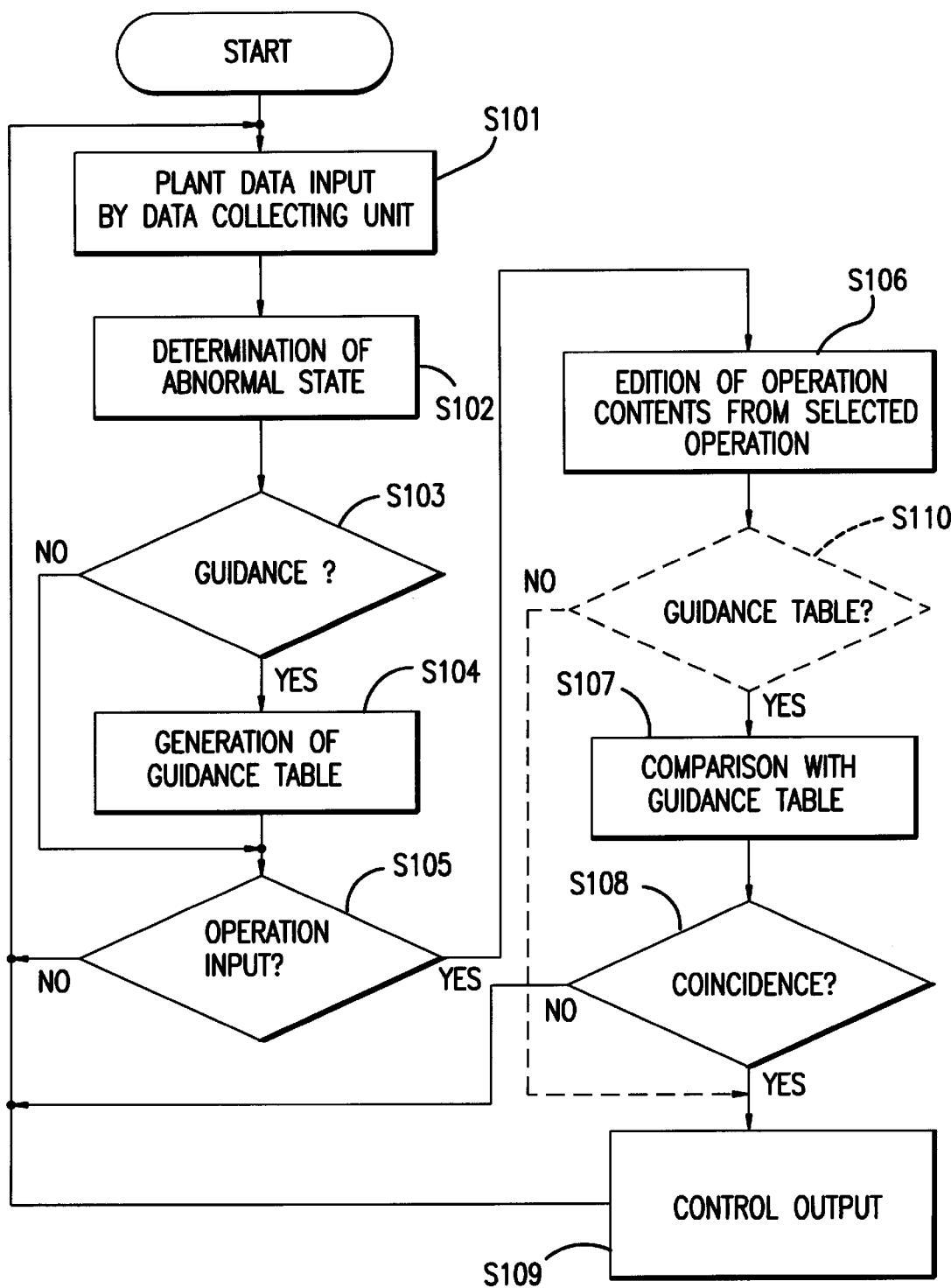
FIG. 2 is a flowchart of an operator support system according to embodiment 1 of the invention.

If no guidance table has been generated or if all the operations in the guidance table have been completed, the running operation evaluation processing unit 23 checks to determine if there is a guidance step which has not yet been operated in step S110, as indicated by the broken line in FIG. 2. If there is no corresponding guidance, the control output is outputted to the plant 11 without change in step S109. However, such a case is the same as the aforementioned conventional case. Therefore, in the following description of the embodiment, it is assumed that the corresponding guidance exists.

Figure 3:
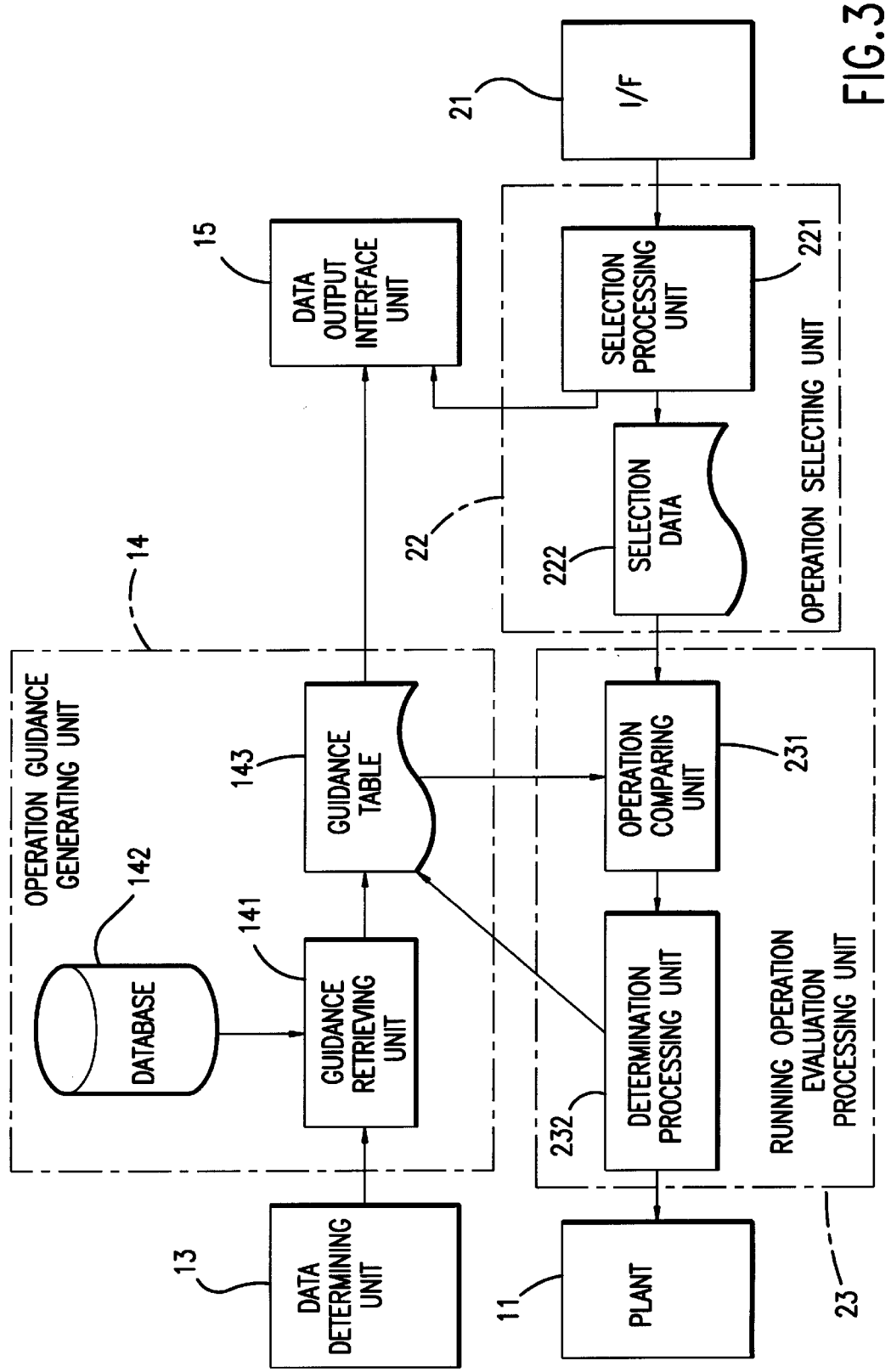
FIG. 3 illustrates the essential parts of the operator support system according to embodiment 1 of the invention.

FIG. 3 illustrates in more detail the essential parts of embodiment 1 of the present invention, including further details of operation guidance generating unit 14, operation selection unit 22 and running evaluation processing unit 23. In FIG. 3, a guidance retrieving unit 141 generates a guidance table 143 by retrieving predetermined operation guidance data from a guidance database 142 according to instructions provided by the data determining unit 13. A selection processing unit 221 edits and outputs selection data 222 as the operation contents which are selected by the operator and transmitted through operation interface input unit 21. An operation comparing unit 231 compares the operation contents represented by the selection data 222 with the operation contents recorded in the guidance table 143. A determination processing unit 232 sets an operation completion flag in the guidance table 143 on the basis of the results of the comparison made by the operation comparing unit 231 and outputs the control output to the plant 11 if the selection data 222 is determined to be correct based on the comparison of the selection data 222 with the operation contents stored in guidance table 143. Reference numerals in FIG. 3 identical to those in FIG. 2 represent identical elements.

FIG. 4 illustrates data contents of the guidance table 143 and the selection data 222 employed in the embodiment 1. FIG. 4(A) illustrates the contents of guidance table 143 as generated by the operation guidance generating unit 14. FIG. 4(B) illustrates the contents of selection data 222 outputted by the operation selecting unit 22. The guidance table 143 shown in FIG. 4(A) contains n (n is an integer which is equal to or larger than 1) guidance data items representing operation contents. For each of n guidance data items, a guidance statement 143a, a control object equipment code 143b, an operation content code or a set value 143c and an operation completion flag 143d are displayed on the display 16. The selection data 222 shown in FIG. 4(B) has a control object equipment code 222a and an operation content code or a set value 222b.

Figure 5:
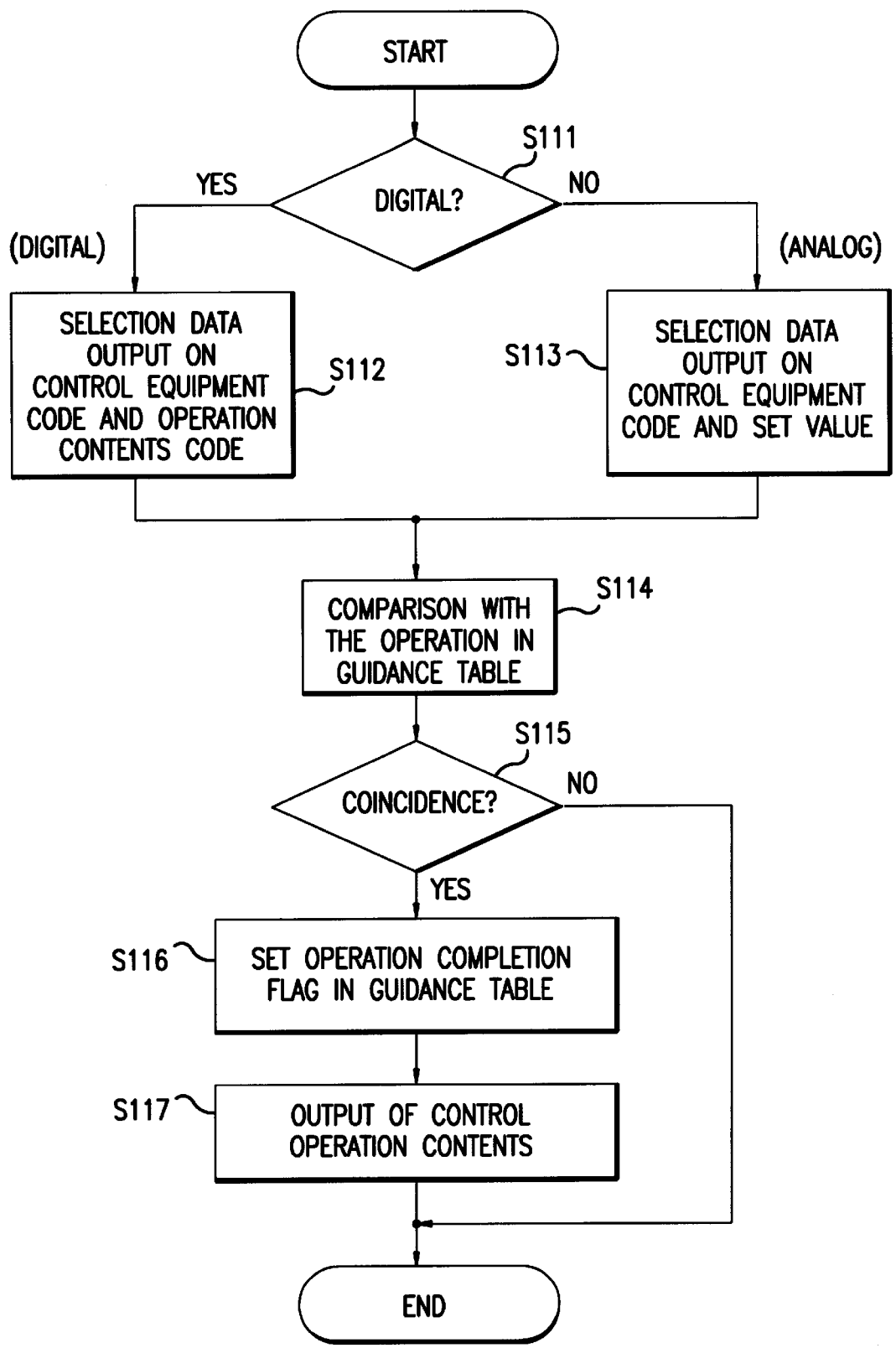
FIG. 5 is a flowchart of the operation of the essential parts of the operator support system according to embodiment 1 of the invention.

The operation of the operation selecting unit 22 and that of the running operation evaluation processing unit 23 will be described in more detail with reference to FIG. 5. The selection processing unit 221 of the operation selecting unit 22 receives data on the operator's selected equipment from the input device 20, and indicates the selected equipment on the display device 16 by inverting, flickering or color changing the display of a symbol or switch representing the corresponding equipment. FIG. 6(B) illustrates an example of an operation selection screen 162 displayed at this point in the process. Thereafter, it is determined in step S111 whether the selected equipment is equipment controlled by a digital signal (a signal indicating on or off) or an analog signal (a signal indicating a set numeral). If it is determined that the selected equipment is digital, the operator's input of the operation contents thereof from the input device 20 is awaited in step S112. If it is determined that the selected equipment is analog, input of the set value thereof is awaited in step S113. When input is completed in either step S112 or step S113, the selection processing unit 221 codes the selected operation contents and outputs the coded operation contents as the selection data 222.

The operation comparing unit 231 of the running operation evaluation processing unit 23 compares the selection data 222 with the guidance data of the guidance table 143 in step S114. At this point, the control object equipment code coinciding with the control object equipment code indicated by the selection data is first retrieved. If there is no control object equipment code which is coincident with the selection data 222, a determination of non-coincidence N is made in step S115. If there is a control object equipment code which is coincident with the selection data 222, it is further determined whether the operation contents code or set value of the guidance table 143, corresponding to the coincident control object equipment code, is coincident with the operation content code or set value of the selection data 222. If there is no coincidence, a determination of non-coincidence N is made in step S115. If coincident is obtained in both the control object equipment code and the operation contents or set value, it is determined whether the corresponding operation completion flag is set. If no operation completion flag has not been set, a determination of non-coincidence N is made in step S115. The determination processing unit 232 of the running operation evaluation processing unit 23 (FIG. 3) outputs to the plant 11 only the operation contents on which coincidence has been determined in step S115 and does not output, to the plant 11, the operation contents on which non-coincidence N has been determined in step S115.

That is, if it is determined in step S115 that there is coincidence (Y) in both the control object equipment code and the operation contents or the set value and if no operation completion flag is set, i.e., if it is determined that the operation contents represented by the selection data 222 are correct, the determination processing unit 232 sets the operation completion flag on the operation contents in the guidance table 143 on which coincidence has been determined in step S116 in order to prevent double operation, and outputs the operation contents to the plant 11 as a control instruction signal in step S117.

FIG. 6(A) illustrates a display example of a guidance display screen 161 in the operator support system of the embodiment 1 according to the invention. FIG. 6(B) illustrates a display example of an operation selection screen 162. As shown in FIG. 6(a), in the guidance display screen 161, guidances G1, G2 and G3 are displayed on the display device 16 through the data output interface unit 15 according to the data output in the guidance table 143. When the operator touches, for example, the portion of the screen corresponding to the guidance "B supply water control valve opening" G1 of the input device 20 employing the touch panel displays, there appears on another display device 16, the operation selection screen 162 associated with that operation guidance, as shown in FIG. 6(B). When the operator then touches, for example, a valve symbol G4, the operation selecting unit 22 gives, to the data output interface unit 15, an instruction of flickering the selected symbol, and the operator then selects the operation contents, that is, the valve opening/closing symbol G5 or G6. The selected contents are inputted to the operation selecting unit 22 through the operation input interface unit 21, and the operation selecting unit 22 edits the equipment code 222a and the operation contents code 222b as the selection data 222 and sends the selection data to the running operation evaluation processing unit 23.

If the operator selects "A supply water control valve" and selects "opening" operation thereof by mistake on the screen, since those operation contents are different from the guidance "B supply water control valve opening operation" G1, the running operation evaluation processing unit 23 evaluates an operation error, i.e., evaluates that the equipment A is mistaken as the equipment B, and that operator's selection data is not sent to the plant 11 as a control instruction.

In the embodiment 1, if the operator selects an erroneous operation which is not coincident with the operation guidance data when the operator selects an operation utilizing that operation guidance data, the running operation evaluation processing unit 23 prevents output of that erroneous operation to the plant. It is thus possible to provide a safe operator support system which is free from operator's operation errors. Further, when the operation contents are evaluated as correct operation contents by the running operation evaluation processing unit 23, completion of the operation is recorded on the data in the guidance table 143 which corresponds to those operation contents. Thus, it is possible to prevent re-operation of the already completed operation contents.

While the running operation evaluation processing unit 23 is shown in the above embodiment as evaluating the correctness of the operation contents for an analog device by coincidence in the set value, it can also evaluate the correctness of the operation when the value set by the operator is approaching the value indicated by the guidance. While the above embodiment is shown as employing the set value in the guidance table 143 generated by the operation guidance generating unit 14, alternate embodiments contemplate an operator support system wherein the range of the set values is outputted in place of the set value in the guidance table 143 so that the running operation evaluation processing unit 23 can evaluate the correctness of the operation when the set value set by the operator is within that range of set values.

Embodiment 2

Figure 7:
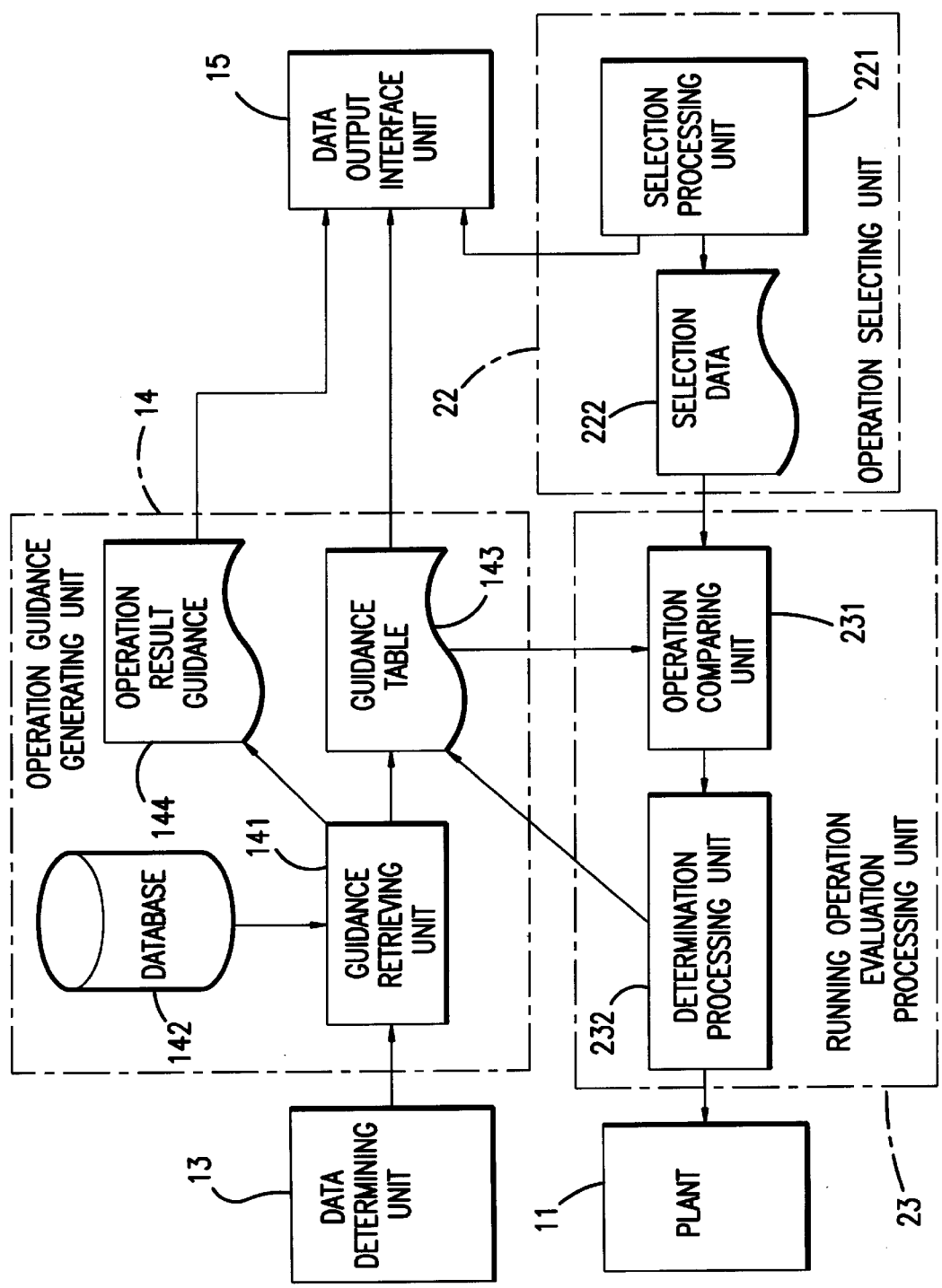
FIG. 7 illustrates the essential parts of the operator support system according to embodiment 2 of the invention.

FIG. 7 illustrates the essential parts of embodiment 2 of the operator support system according to the invention. The structure shown in FIG. 7 differs from that shown in FIG. 3 in that operation result guidance data 144 is generated through the guidance retrieving unit 141 to perform guidance of an operation error to the operator relative to the operation which has been determined as an operation error by the determination processing unit 232. Other reference numerals in FIG. 7 are identical to those in FIG. 3 and represent similar or identical elements.

Figure 8:
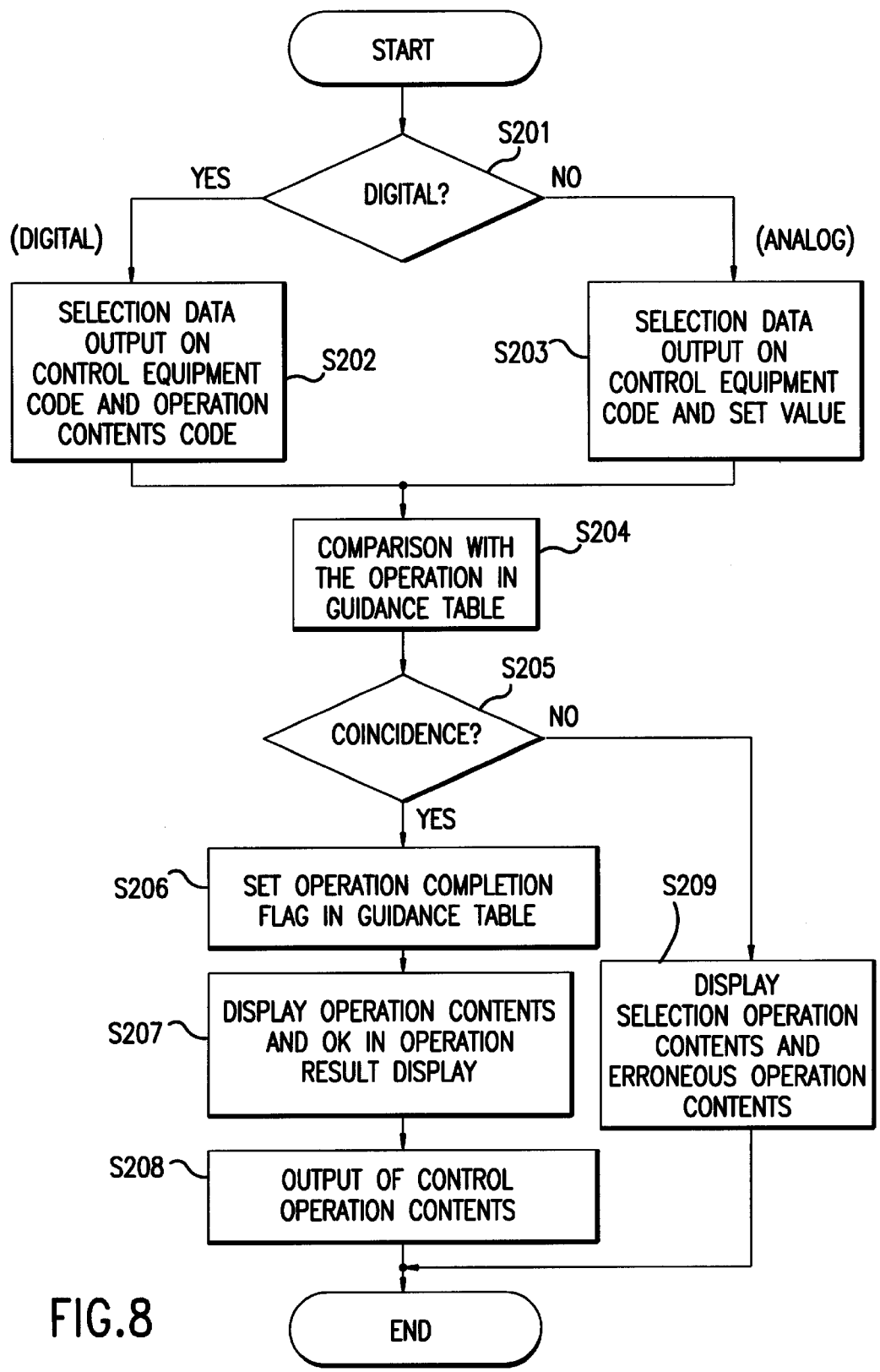
FIG. 8 is a flowchart illustrating the operation of the essential parts of the operator support system according to embodiment 2 of the invention.

The operation of embodiment 2 will now be described with reference to FIG. 8. In FIG. 8, the processing from steps S201 to S206 are the same as those of steps S111 to S116 shown in FIG. 5, and further detailed description thereof is therefore omitted. If it is determined in step S205 that the operation contents code or the set value 143c of the guidance table 143 are coincident with the operation contents code or the set value 222b of the selection data 222, the operation completion flag 143d is set on the operation contents in the guidance table data 143 corresponding to the coincident operation contents in step S206. Thereafter, the determination processing unit 232 generates the operation result guidance data 144 through the guidance retrieving unit 141 in step S207 so that both the operation contents and "OK" can be displayed in the operation results display on the display device 16 which is displaying the guidance to the operator. In step S208, the operation contents selected by the operator are output to the plant 11 as the control instruction signal.

If it is determined in step S205 that the operation contents code or the set value 143c of the guidance table 143 is not coincident with the operation contents code or the set value 222b of the selection data 222, the determination processing unit 232 generates the operation results guidance data 144 through the guidance retrieving unit 141 so that the selected operation contents and the erroneous operation contents can be displayed in the operation results display on the display device 16 which displays the guidance to the operator, and the system does not output the operation contents selected by the operator to the plant 11.

Figure 9:
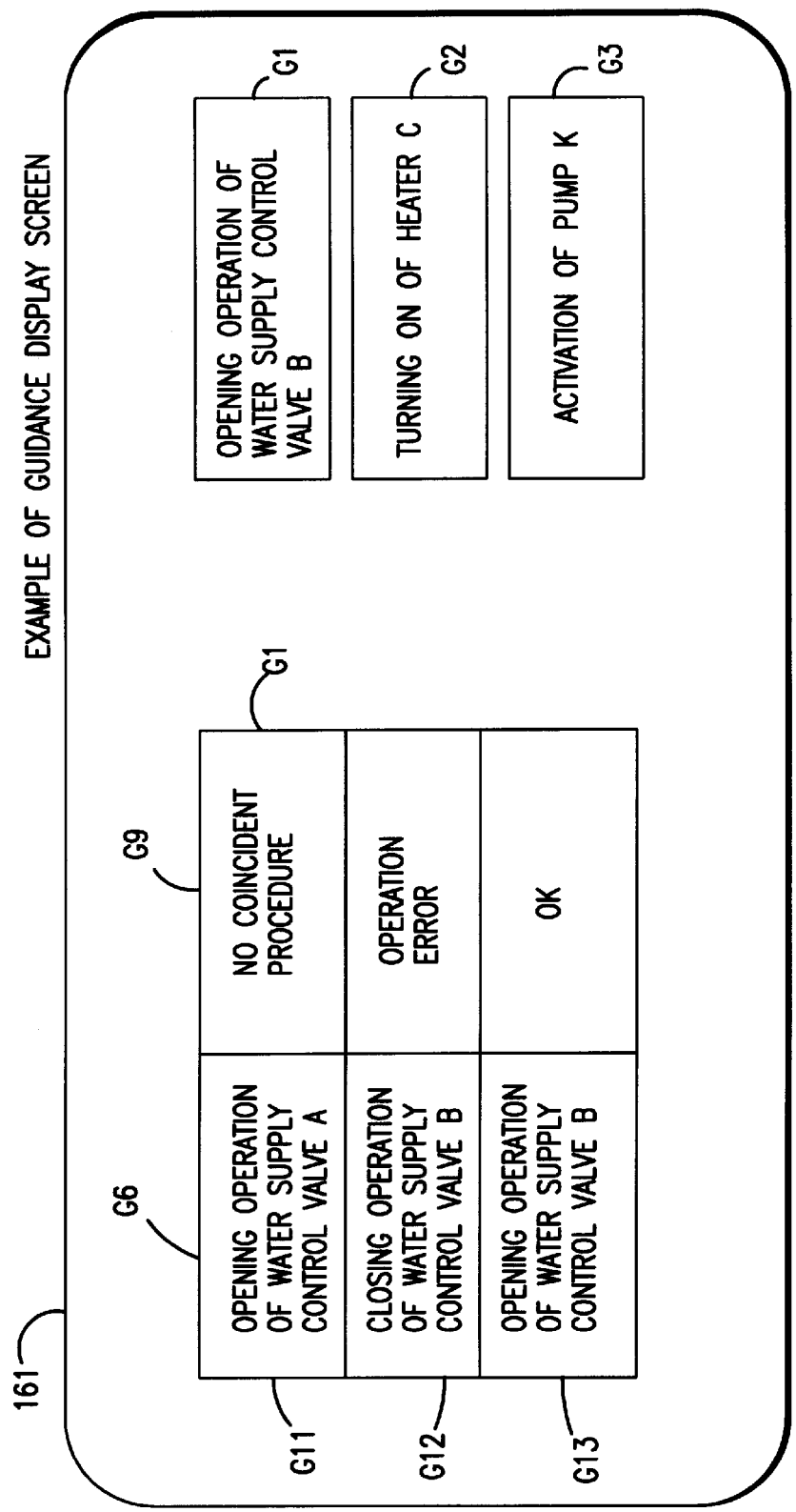
FIG. 9 illustrates a screen display example of the operator support system according to embodiment 2 of the invention.

FIG. 9 illustrates a display example of the guidance display screen 161 of embodiment 2. Column G9 indicates the operation contents representing the operations selected by the operator. Column G10 indicates the contents of an erroneous operation if the results of the operation selected by the operator are erroneous, or "OK" if the results of the operation contents selected by the operator are correct. A display line G11 indicates that the operator has selected "A supply water control valve opening operation" relative to the guidance "B supply water control valve opening operation" G1, and that the results of the determination, "there is no corresponding operation", has been obtained. Display line G12 indicates that the "B supply water control valve closing operation" selected by the operator is "an erroneous operation" (because the guidance requests the opening operation of the valve). Display line G13 indicates that a correct operation has been selected relative to the guidance G1, that the results, "OK", have been obtained, and that operation selected by the operator has been outputted to control the plant. When a correct operation is selected, the result can also be displayed to the operator by changing the color of the guidance or erasing the guidance. Further, when an erroneous operation is selected, the result may also be signaled by an alarm or other sound to the operator.

As will be understood from the foregoing description, in addition to the advantages of the first embodiment, the second embodiment has the further advantage that even if the results of the operation the operator has selected according to the operation guidance are erroneous, the contents of that erroneous operation are displayed to the operator so as to enable the operator to select the correct operation in a follow-up step.

Embodiment 3

FIG. 10 illustrates the essential parts of embodiment 3 of the invention. The structure of embodiment 3 shown in FIG. 10 differs from that of embodiment 2 shown in FIG. 7 in that an enforcement determining unit 233 is provided in the running operation evaluation processing unit 23.

When the operator selects operations according to the operation guidance, the system checks to determine whether the operation selected by the operator is in accordance with the guidance, as in the cases of embodiments 1 and 2. However, the operator may desire to perform an operation which is not listed in the guidance. Embodiment 3 takes this into consideration and allows the operator to implement or enforce a desired operation. FIG. 11 illustrates the selection data 222 of the operation selecting unit 22 which is employed in embodiment 3. In addition to the selection data 222a and 222b employed in embodiments 1 or 2, the selection data 222 of embodiment 3 has an enforcing flag 222c. The enforcing flag 222c is inputted to indicate that the control object equipment and operation contents which are inputted from the input device 20 by the operator are those which are to be enforceably operated. The enforcing flag 222c is set by the operation selecting unit 22.

Figure 12:
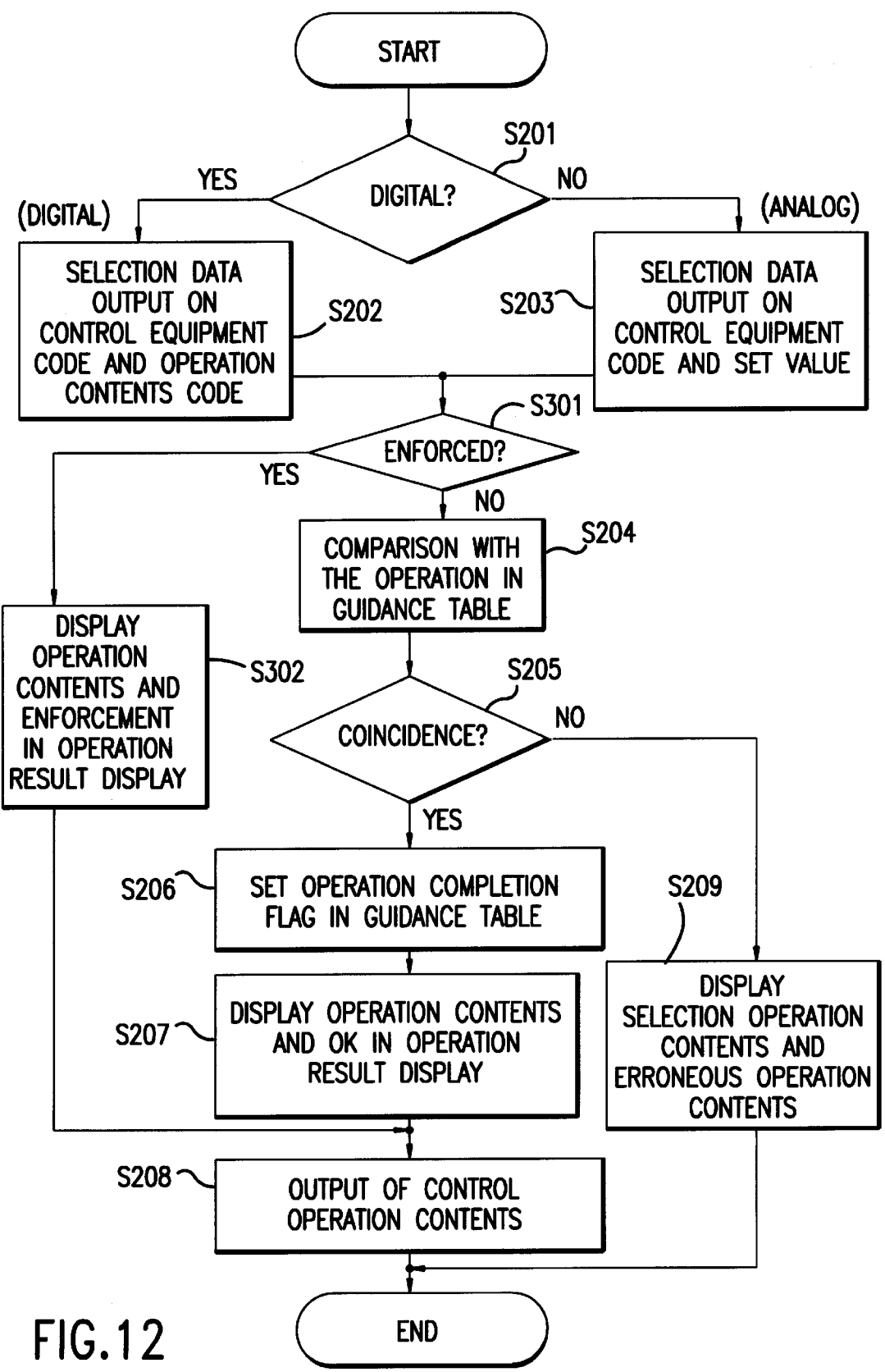
FIG. 12 is a flowchart of the operation of the essential parts of the operator support system according to embodiment 3 of the invention.

The operation of embodiment 3 will be described below with reference to FIG. 12. In FIG. 12, since the processes of steps S201 to S209 are the same as those of embodiment 2 shown in FIG. 8, a further detailed description of these steps is omitted. In step 301, the enforcement determining unit 233 checks the contents of the enforcing flag 222c from the selection data 222 output from the operation selecting unit 22. If the flag indicates an enforcement of a desired operation, the determination processing unit 233 generates the operation results guidance data 144 through the guidance retrieving unit 141 so that the selected operation contents and "enforced" can be displayed in step S302 in the operation results display on the display device which displays the guidance. Thereafter, in step S208, the selected operation contents are outputted to control the plant 11. If it is determined in step S301 that no enforcing flag 222c is set, the processings identical to those of step S204 and subsequent steps of embodiment 2 are conducted.

Figure 13:
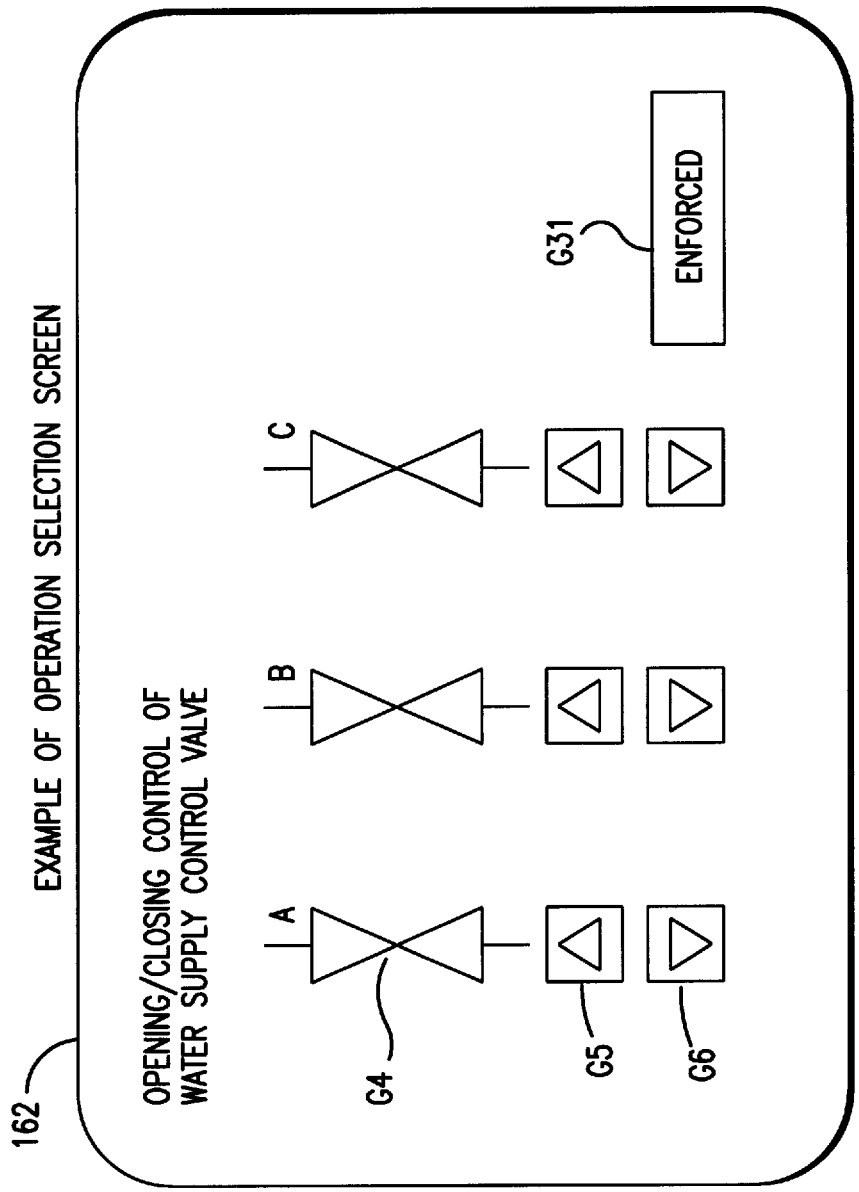
FIG. 13 illustrates a screen display example of the operator support system according to embodiment 3 of the invention.

FIG. 13 illustrates a display example of the operation selection screen 162 employed in the embodiment 3. When the operation which is not suggested by the guidance is enforced, the operator switches the operation mode to the enforcement mode by designating an enforcing switch G31 on the operation selection screen 162, and then performs the same operation selection as that of embodiment 2.

As will be understood from the foregoing description, in addition to the advantages of embodiments 1 and 2, embodiment 3 has the further advantage that the operator can enforce an operation which is not suggested by the operation guidance.

The system can also be arranged such that the operator can enforce an operation which has been evaluated as an error by inputting the error portion (for example, the display line G11 "A supply water control valve opening operation") of the operation results display shown in FIG. 9, which is the screen display example of embodiment 2, from the touch panel after inputting the enforcement switch G31. In this way, the operator can enforce an operation which has been evaluated as an error if he or she considers it necessary.

Embodiment 4

Figure 14:
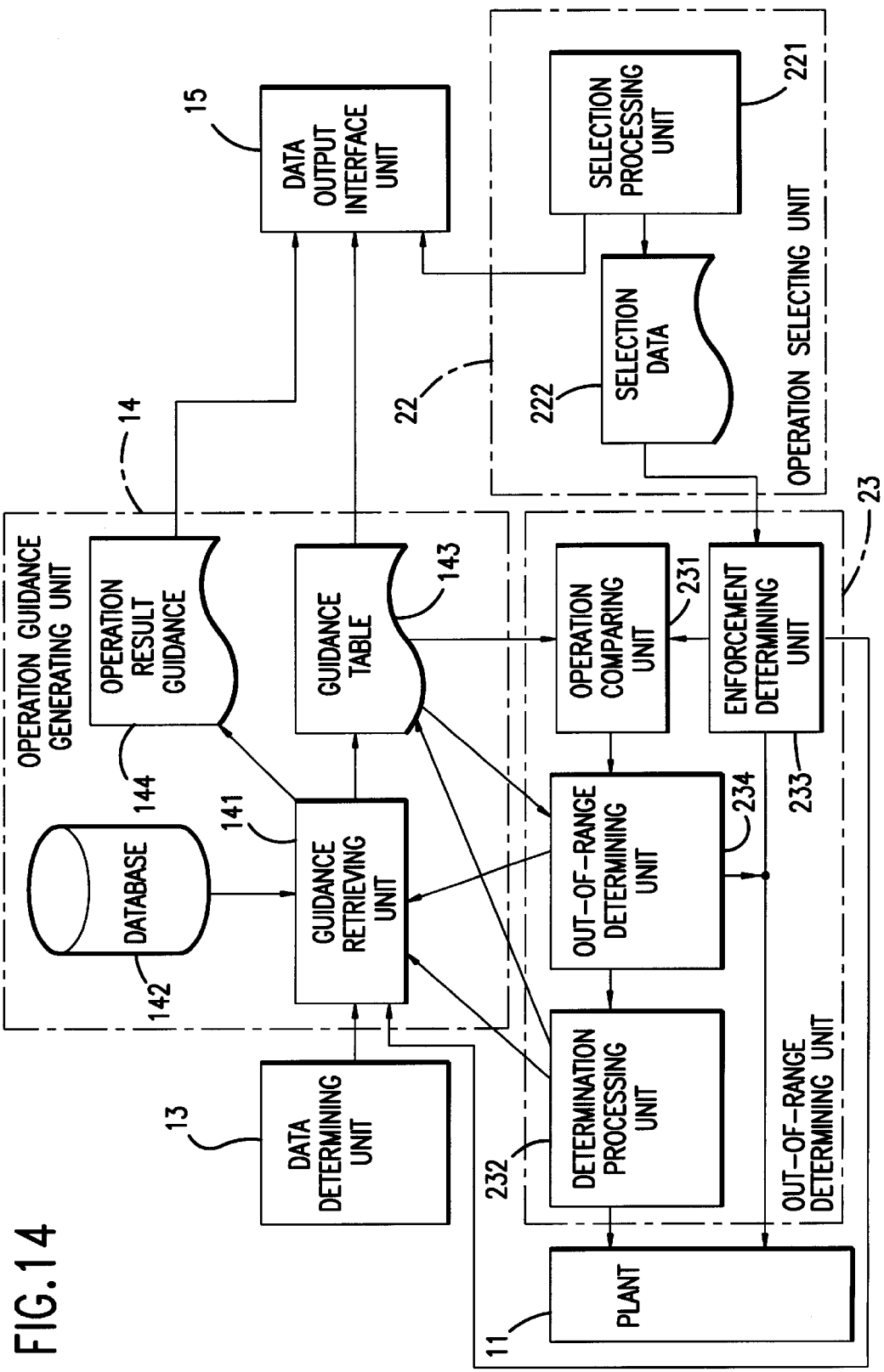
FIG. 14 illustrates the essential parts of the operator support system according to embodiment 4 of the invention.

FIG. 14 illustrates the essential parts of embodiment 4 of the operator support system according to the invention. The structure shown in FIG. 14 differs from the structure of embodiment 3 shown in FIG. 10 in that an out-of range determining unit 234 is provided.

When the operator desires to perform operations quite different from the operation contents indicated by the operation guidance, he or she is able to input operations in the enforcement mode provided in embodiment 3. However, repeating the operations which are necessary in the enforcement mode may be considered troublesome in some applications. The system of embodiment 4 takes this into consideration. That is, if the out-of-range determining unit 234 determines that the operation the operator is selecting is not the operation suggested by the operation guidance, that operation can be outputted regardless of the operation guidance.

Figures 15A, 15B:
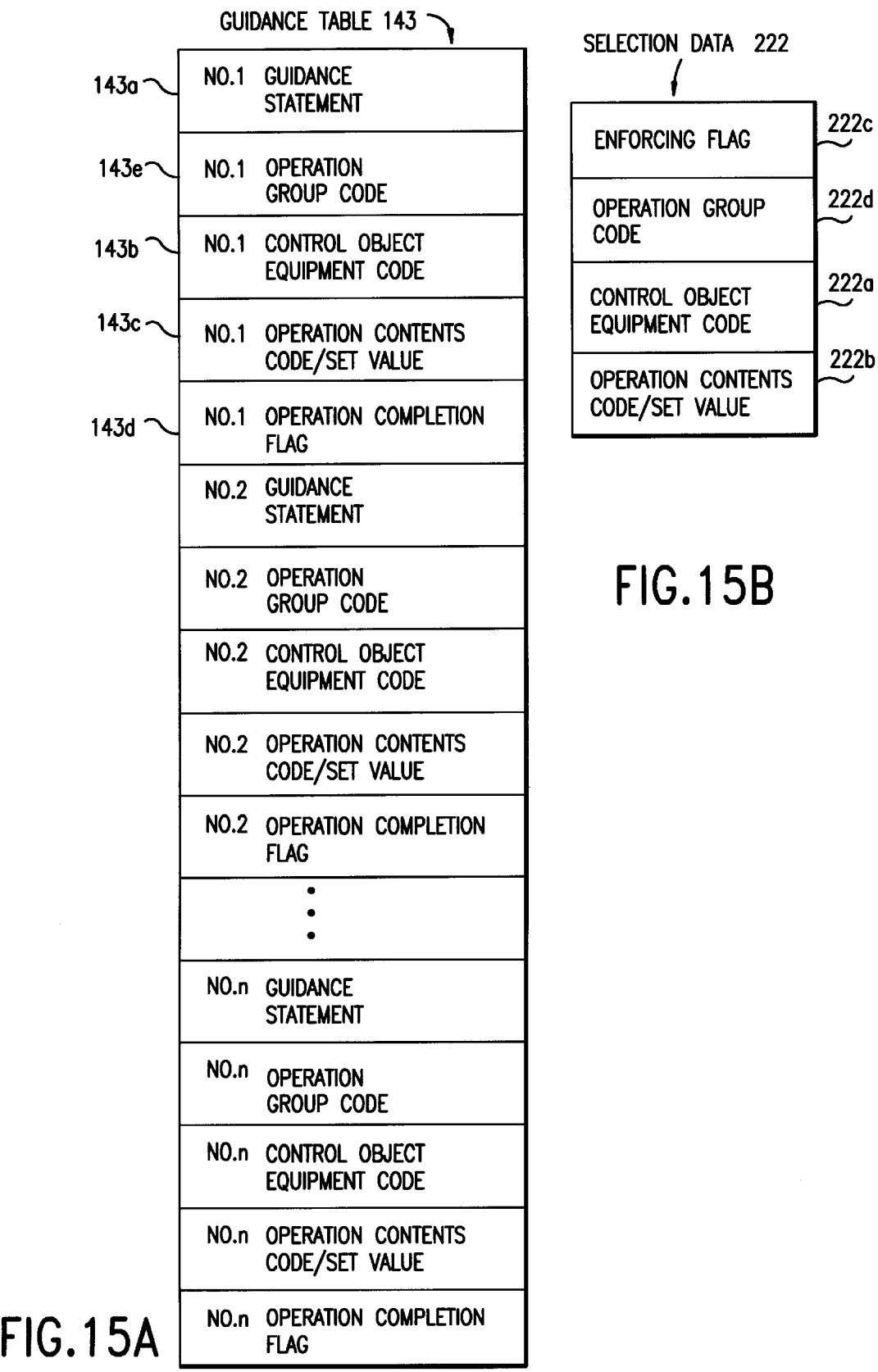
FIGS. 15(A) and 15(B) illustrate data contents of the operator support system according to embodiment 4 of the invention.

In FIG. 15 which illustrates data contents employed in embodiment 4, FIG. 15(A) illustrates the contents of guidance table 143 generated by the operation guidance generating unit 14, and FIG. 15(B) illustrates the contents of selection data 222 outputted by the operation selecting unit 22. In addition to the data items employed in embodiment 1 shown in FIG. 4, each of the guidance data of the guidance table 143 shown in FIG. 15(A) has an operation group code 143e. The selection data 222 shown in FIG. 15(B) has an operation group code 222d and an enforcement flag 222c (the enforcement flag 222c being added in embodiment 3).

Figure 16:
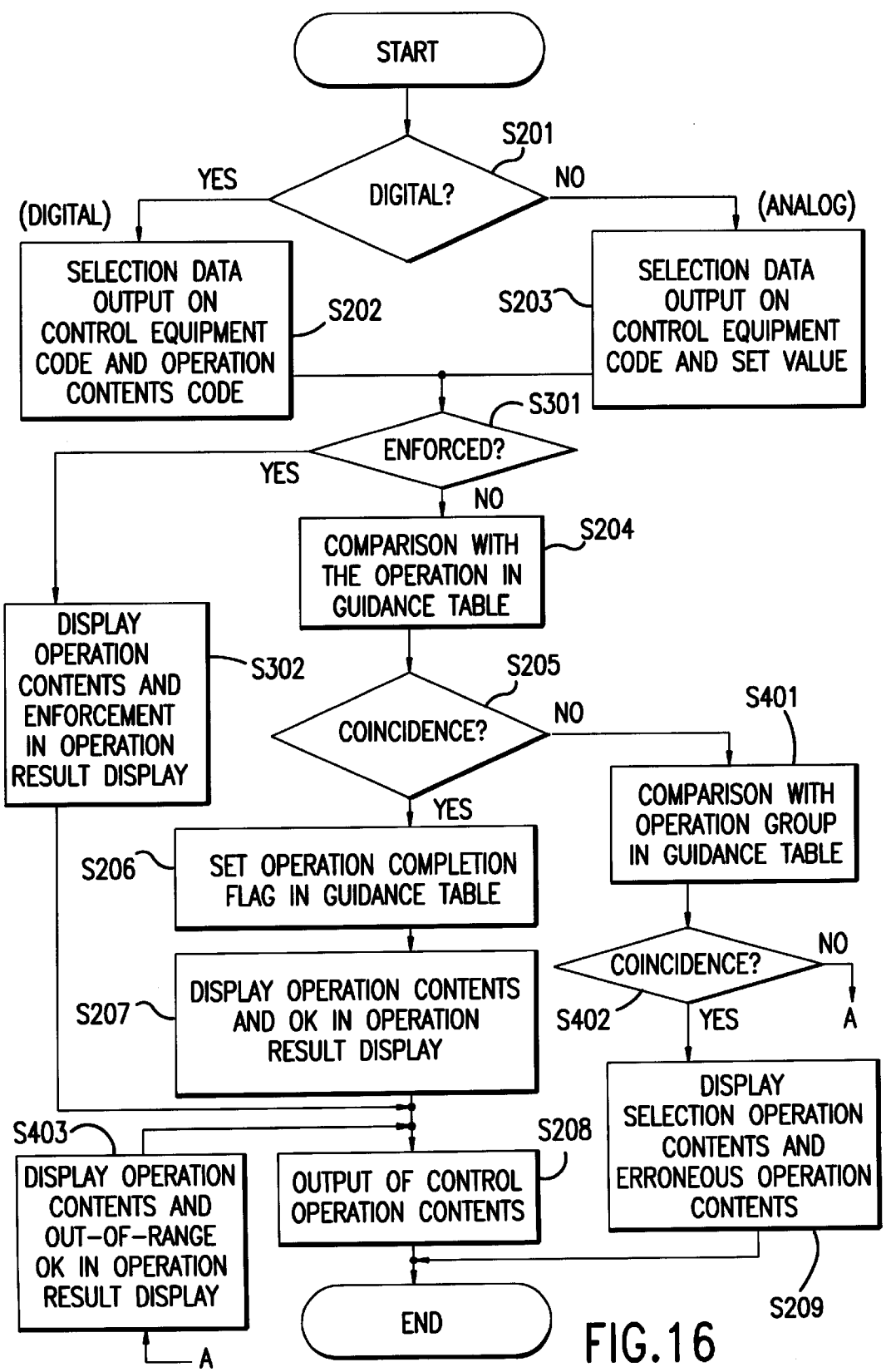
FIG. 16 is a flowchart of the operation of the essential parts of the operator support system according to embodiment 4 of the invention.

The operation of embodiment 4 will be described with reference to FIG. 16. The processing steps of steps S201 to S209, S301 and S302 in FIG. 16 are the same as those of embodiments 2 or 3 with the exception that in step S202 or 203 the selection processing unit 221 of the operating unit 22 edits, together with the control object equipment code 222a, the operation group code 222d predetermined for every selected equipment when the operator has selected the control object equipment. The same operation group code may be set, for example, for every operation selection screen.

If the operation comparing unit 231 determines that the operation contents of the selection data 222 are not coincident with the operation contents of the guidance table data 143 in step S205, the out-of-range determining unit 234 compares the operation group code 143e of the guidance table data 143 with the operation group code 222d of the selection data 222 in step S401. If coincidence is not obtained in the operation group code, i.e., if it is determined that the selected operation is out of evaluation range, the operation result guidance data 144 is generated in step S403 through the guidance retrieving unit 141 so that the selected operation contents and "out-of-range OK" can be displayed in the operation results display on the display device 16 which is displaying the guidance to the operator. Thereafter, in step S208, the selected operation contents are outputted to the plant 11 without change. If it is determined in step S401 that coincidence is obtained in the operation group code, i.e., if it is determined that the selected operation is in the evaluation range, display of an operation error is conducted in step S209, as in the case of embodiment 2, and that operation is not outputted to the plant 11.

As will be understood from the foregoing description, in addition to the advantages described in connection with embodiments 1 to 3, embodiment 4 has a further advantage in that if there is no coincidence in the operation group preset for every equipment, the operator can perform desired operations regardless of the contents of the operation guidance. Thus, it is not necessary for the operator to input the enforcement mode each time the operation which cannot be evaluated by the guidance is processed.

Embodiment 5

Figure 17:
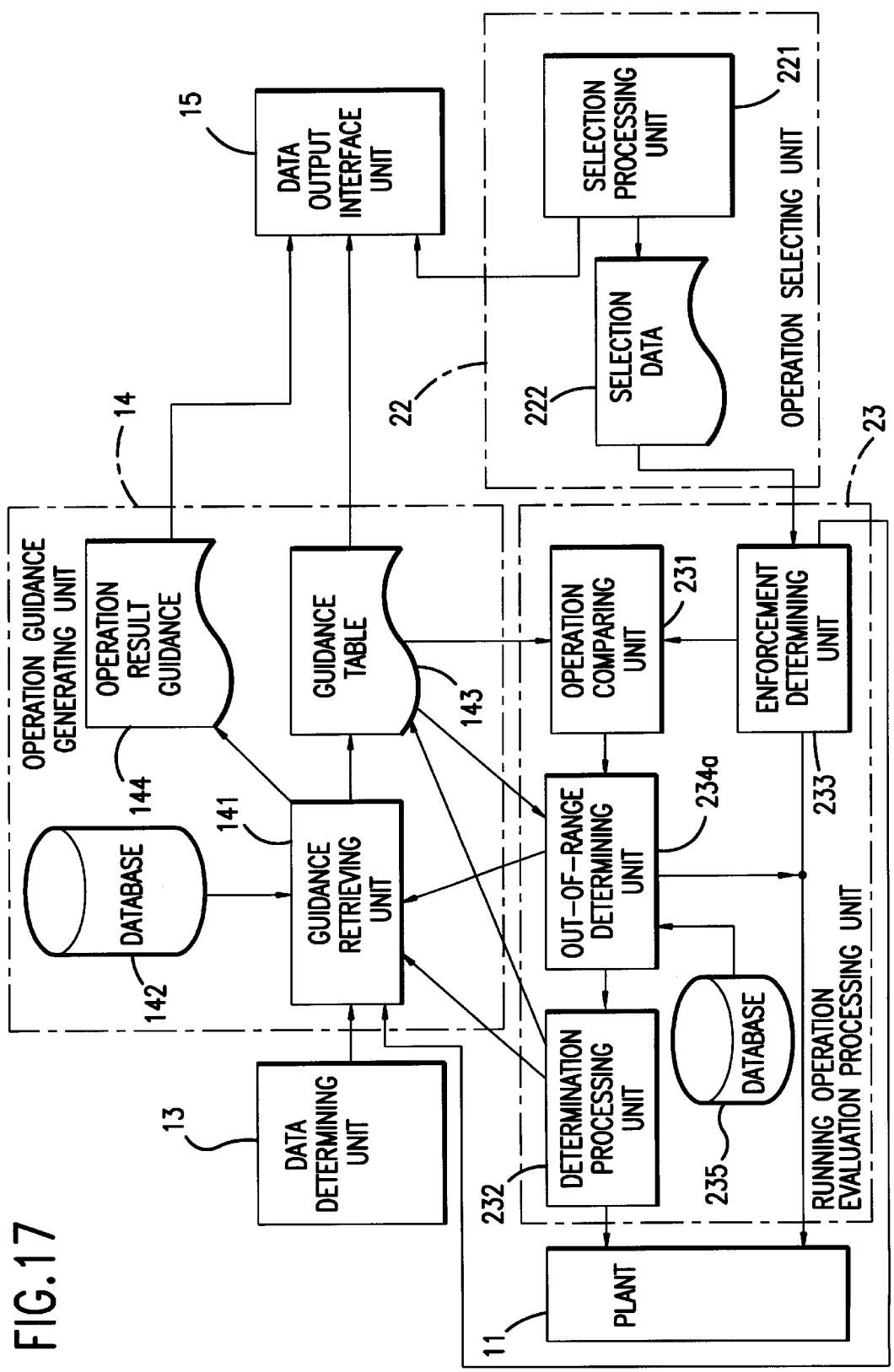
FIG. 17 illustrates the essential parts of the operator support system according to embodiment 5 of the invention.

FIG. 17 illustrates the essential parts of embodiment 5 of the operator support system according to the invention. The structure shown in FIG. 17 differs from that of embodiment 4 shown in FIG. 14 in that an out-of-range determining unit 234a is provided in place of the out-of-range determining unit 234 and in that an operation error determining database 235 is connected to the out-of-range determining unit 143a. Embodiment 5 represents another way of carrying out embodiment 4.

Figure 18:
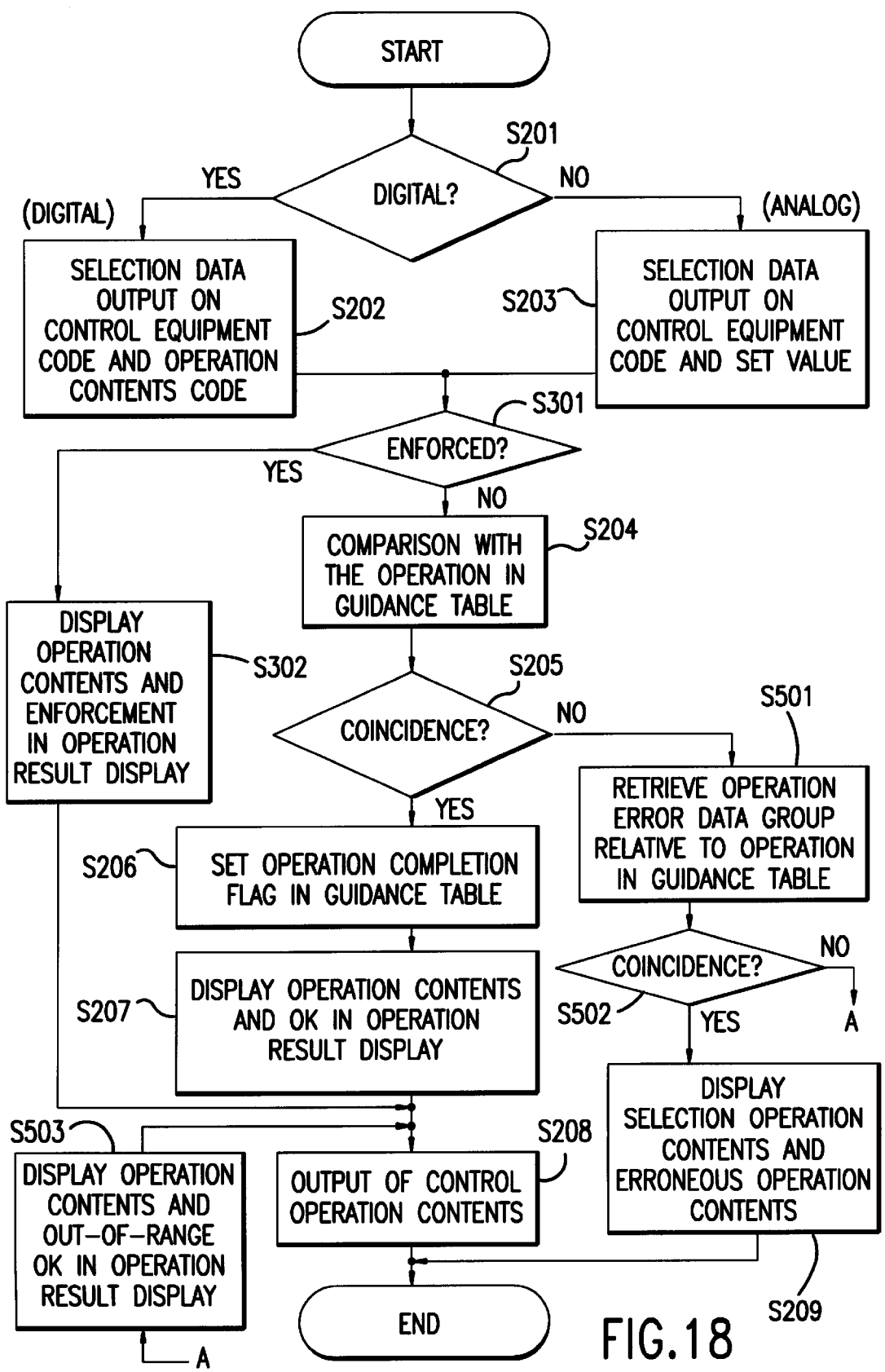
FIG. 18 is a flowchart of the operation of the essential parts of the operator support system according to embodiment 5 of the invention.

The operation of embodiment 5 will be described with reference to FIG. 18. The processings of steps S201 to S209, S301 and S302 shown in FIG. 18 are the same as those of embodiments 2 and 3. Further, unlike embodiment 4, the guidance table data 143 and the selection data 222, employed in embodiment 5, does not employ the operation group codes 222d and 143e shown in FIGS. 15(A) and 15(B), respectively.

If the operation comparing unit 231 determines that the operation contents of the selection data 222 are not coincident with the operation contents of the guidance table 143 in step S205, the out-of-range determining unit 234a retrieves the operation error determining database 235 on the basis of the control object equipment code recorded in the guidance table 143 to obtain control object equipment codes which are to be determined as operation errors in step S501. Thereafter, in step S502, it is determined whether coincidence is obtained between the obtained data group and the control object equipment code 222a of the selection data 222. If coincidence is not obtained, i.e., if it is determined that the selected operation is out of evaluation range, the operation result guidance data 144 is generated in step S503 through the guidance retrieving unit 141 so that the selected operation contents and "out-of-range OK" can be displayed in the operation results display on the display device 16 which is displaying the guidance to the operator. Thereafter, in step S208, the selected operation contents are outputted to the plant 11 without change. If it is determined in step S502 that there is coincidence, i.e., if it is determined that the selected operation is within the evaluation range, display of operation error is conducted in step S209, as in the case of the embodiment 2, and that operation is not output to the plant 11.

Figure 19:
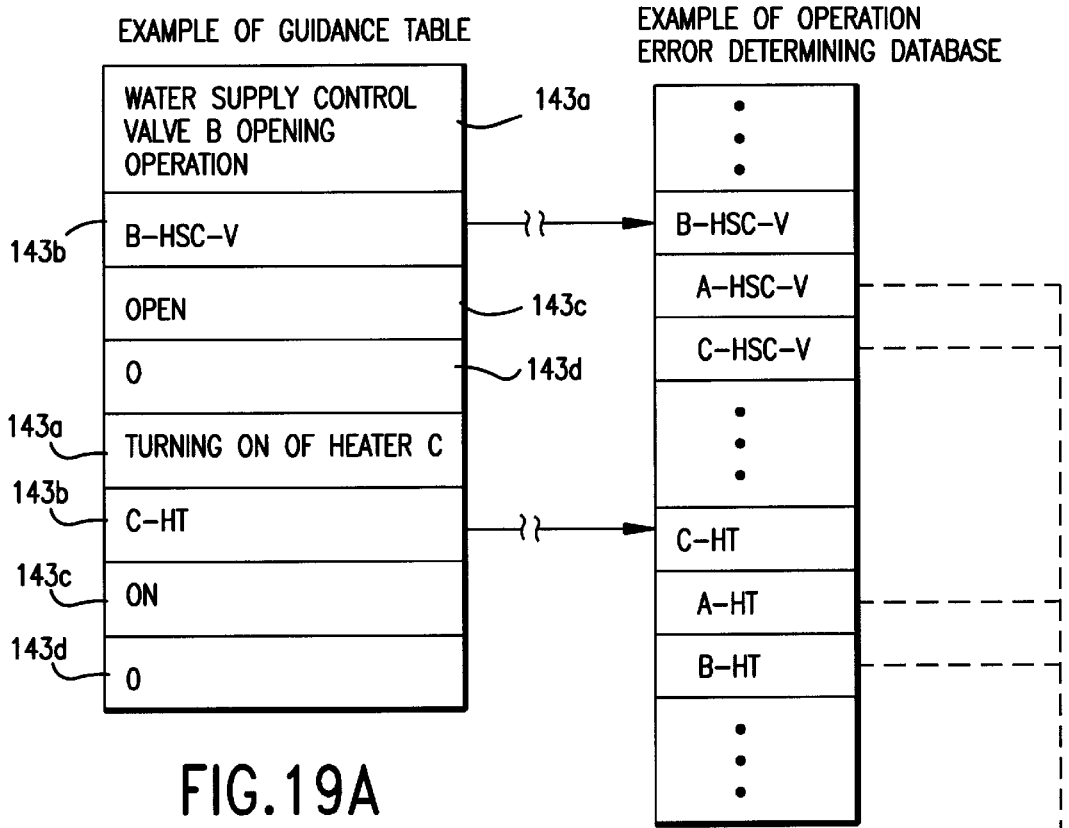
FIGS. 19(A), 19(B) and 19(C) illustrate data contents of the operator support system according to embodiment 5 of the invention.

FIG. 19 illustrates an example of the processing of step S501–S502 which is conducted by the out-of-range determining unit 234a. Relative to a control object equipment code "B-HSC-V" 143b indicating the guidance statement "B supply water control valve" 143a in the guidance table 143 shown in FIG. 19(A), the equipments which can be the objects of operation errors are stored in the database 235, as shown in FIG. 19(B). From the database 235 are retrieved "A-HSC-V" and "C-HSC-V". Similarly, "A-AT" and "B-AT" are retrieved from the database 235 as the equipments which are the objects of operation errors corresponding to the guidance statement "C heater" 143a. The out-of-range determining unit 234a determines coincidence or non-coincidence between the equipment code data group (shown in FIG. 19(C)) representing the objects of operation errors and the control object equipment in the selection data 222.

As will be understood from the foregoing description, in addition to the advantages described in connection with embodiments 1 to 3, embodiment 5 has a further advantage in that the operations that cannot be evaluated from the guidance can be minimized because the running operation evaluation processing unit 23 performs evaluation only on the operation error objects predetermined for every equipment, and in that desired operations can be performed on the equipment which are not the operation error objects. Further, since the equipment on which operation error may occur readily can be registered in the database beforehand, effective evaluation can be performed.

Embodiment 6

Figure 20:
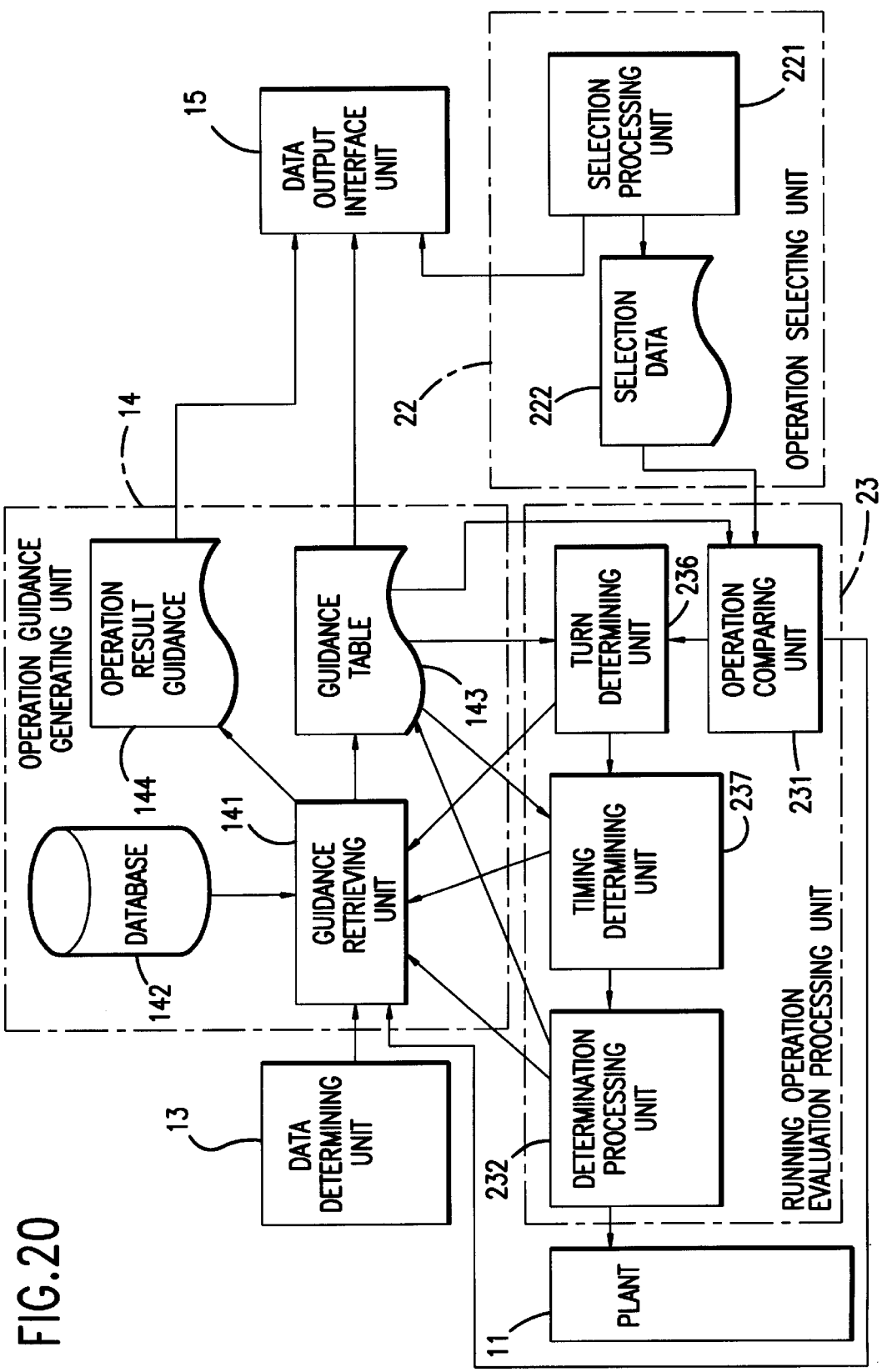
FIG. 20 illustrates the essential parts of the operator support system according to embodiment 6 of the invention.

FIG. 20 illustrates the essential parts of embodiment 6 of the operator support system according to the invention. The structure shown in FIG. 20 differs from that of embodiment 2, shown in FIG. 7, in that a turn determining unit 236 for determining the turn of an operation and a timing determining unit 237 for determining the timing of an operation are provided in the running operation evaluation processing unit 23.

The operator support system according to embodiment 6 is designed such that when an operation guidance in which the sequence of operations is determined is offered, determination as to whether the operation is conducted at a correct turn is also made and such that when the operation guidance is offered together with an operated time limit, determination as to whether the operation is conducted at a correct timing is also made.

FIG. 21 illustrates the guidance table data 143 employed in embodiment 6. In addition to the data items contained in the guidance data of the guidance table shown in FIG. 4(A) and employed in embodiment 1, each of the guidance data in the guidance table shown in FIG. 21 has a turn determining flag and time data. The selection data 222 employed in the embodiment 6 is the same as that shown in FIG. 4(B).

Figure 22:
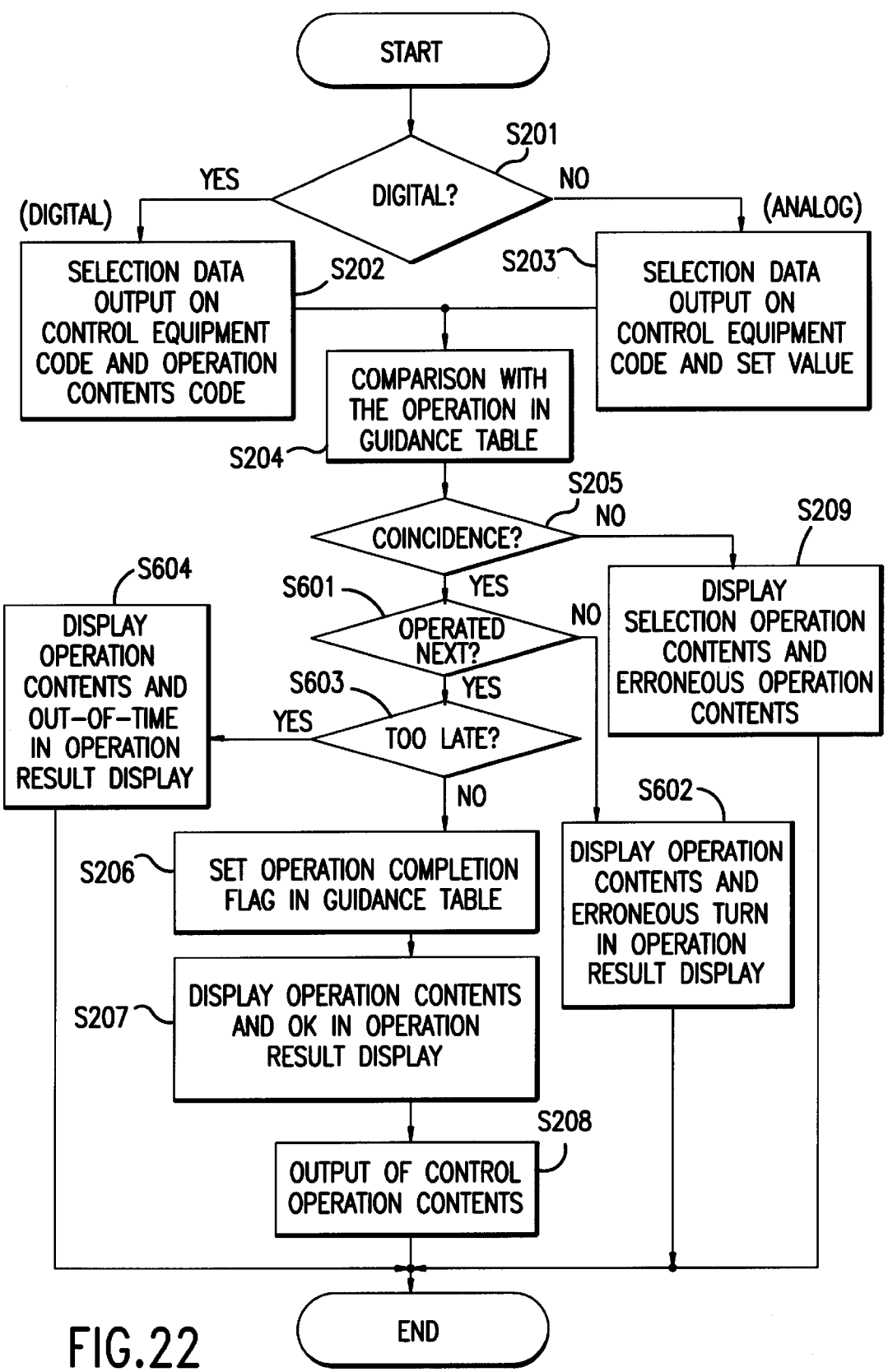
FIG. 22 is a flowchart of the operation of the essential parts of the operator support system according to embodiment 6 of the invention.

The operation of the embodiment 6 will now be described with reference to FIG. 22. The processings from steps S201 to S209 are the same as those described with reference to FIG. 8 in the embodiment 2. If the operation comparing unit 231 determines that the operation contents of the selection data 222 are coincident with the operation contents of the guidance table data 143 in step S205, in step S601 the procedure determining unit 236 determines whether or not a turn determining flag 143g is set on the guidance table data 143 corresponding to the presently coincided operation contents, and if the flag is set, retrieves the other operation contents on which the turn determining flag is set to determine whether or not there are the operation contents on which no operation completion flag 143d is set and which are to be processed prior to the present operation contents (this means that there are the operation contents to be processed subsequently). The operation contents of the guidance table data 143 are outputted in the order in which they are to be operated, and the procedure determining unit 236 checks which operation contents are to be processed next by checking that order.

If it is determined in step S601 that there are the operation contents to be processed subsequent to the present operation contents, the operation result guidance 144 is generated through the guidance retrieving unit 141 so that the selected operation contents and "erroneous turn" can be displayed in the operation result display on the display device 16 which is displaying the guidance, and the selected operation contents are not output to the plant 11 in step S602. If there are no operation contents to be processed subsequent to the present operation contents or if no turn determining flag 143g is set (this means that the operation contents can be processed any time), the process goes to step S603.

In step S603, the timing determining unit 237 determines whether or not time data 143f is set on the guidance table data 143 corresponding to the present operation contents, and if the time data 143f is set, compares the time data 143f with present time data. If the period of time in which the present contents are to be processed has passed, the timing determining unit 237 determines that the processing is too late, and the operation guidance data 144 is generated through the guidance retrieving unit 141 so that the selected operation contents and "too late" can be displayed in the operation result display on the display device 16 which is displaying the guidance to the operator in step S604. Those operation contents are not outputted to the plant 11.

If it is determined in step S603 that no time data 143$f$ is set (for example, if hexadecimal FF is set in time, minute or second) or if the set time data 143$f$ represents a time which is later than the present time, the normal processings from steps S206 to S208 are performed in the same manner as that of embodiment 2.

Figure 23:
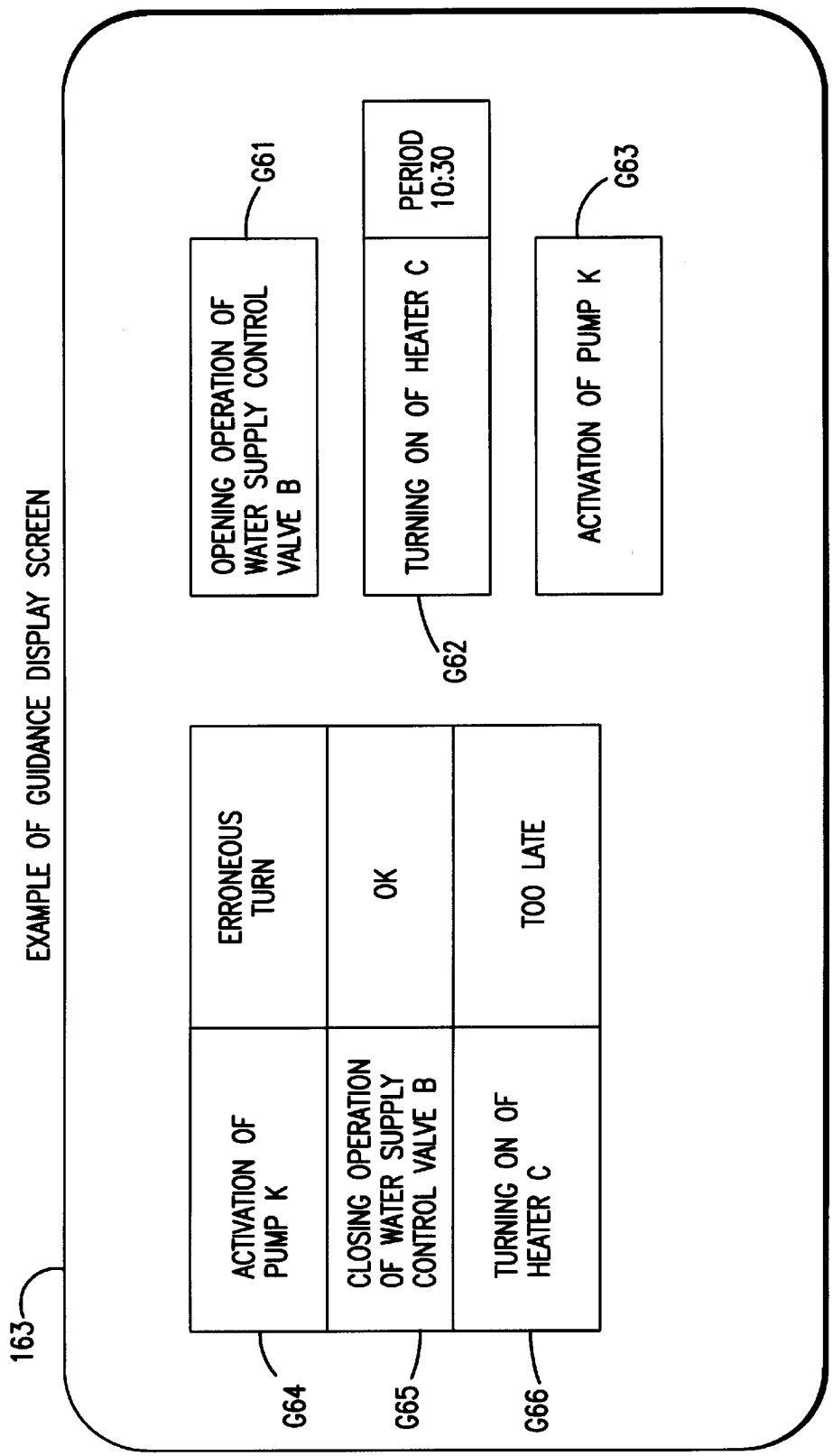
FIG. 23 illustrates a screen display example of the operator support system according to embodiment 6 of the invention.
Figure 24:
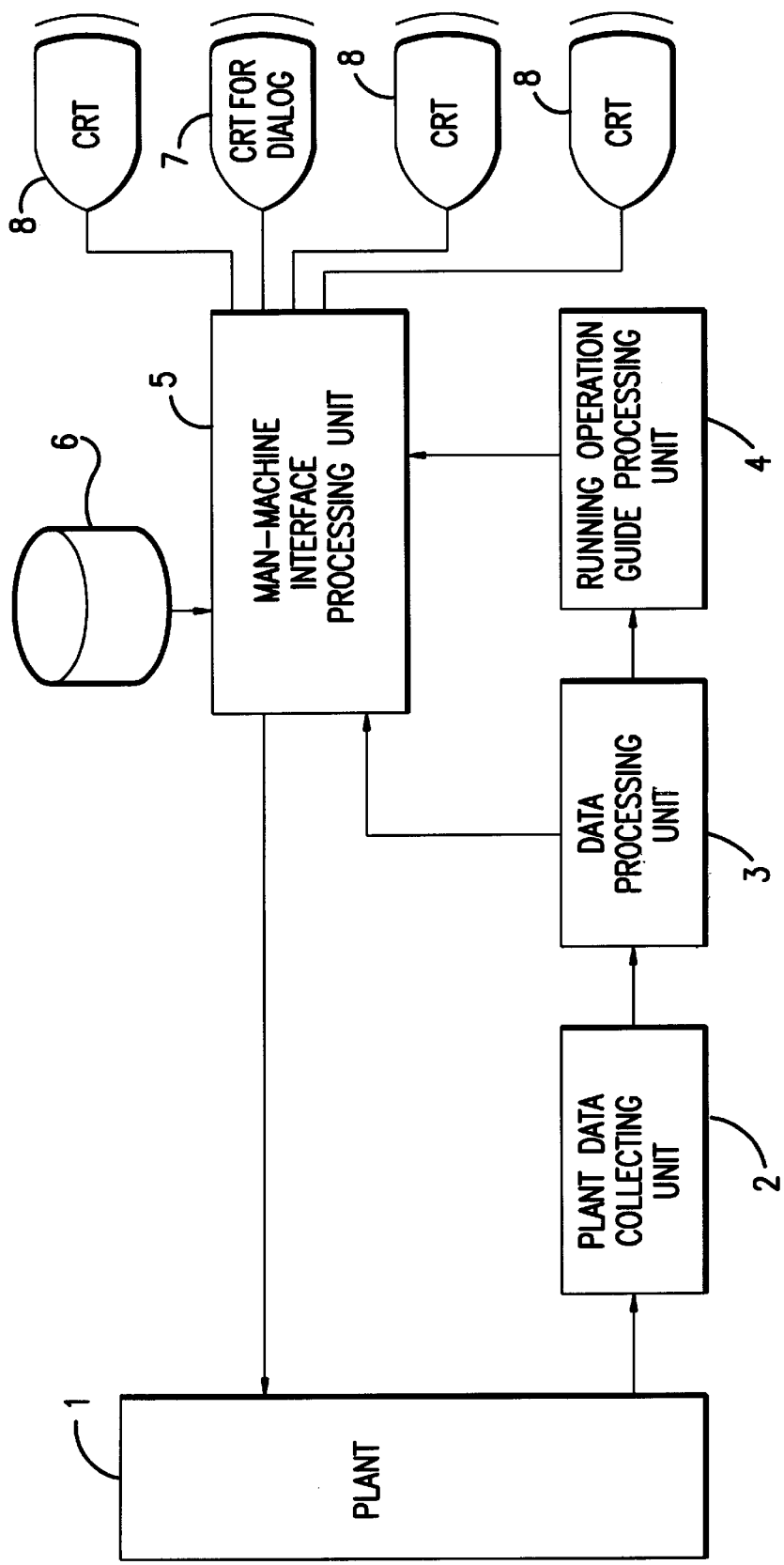
FIG. 24 is a complete block diagram of a conventional operator support system.

FIG. 23 illustrates a display example of the guidance display screen 163. In operation guidances G61 to G63, guidance "B supply water control valve opening operation" G61 and guidance "K pump activation" G63 are displayed in half-tone dot meshing, indicating that they are the operation contents having a determined turn to be operated. In the operation result displays G64 to G66, the display "K pump activation" G64 is displayed together with "erroneous turn", indicating that the turn at which the operation is operated is erroneous. The operation result display "B supply water control valve opening operation" G65 is displayed together with "OK", indicating that the turn at which "B supply water control valve opening operation" is operated subsequent to "K pump activation" is correct. Guidance "C heater turning on" G62 is displayed together with data representing a time limit "10 : 30". Operation result display "C heater turning on" G66 is displayed together with "too late", indicating that "C heater turning on" could not be operated because the operation has been designated too late, i.e., after "10 : 30".

As will be understood from the foregoing description, in addition to the advantages of embodiments 1 and 2, embodiment 6 of the present invention has a further advantage in that an operation error due to a procedure error can be prevented because determination as to whether the operator is operating operations in the correct sequence is also made. Further, in embodiment 6, since time data is provided in the operation guidance so as to enable determination as to whether the operation is too late to be made, the operation contents which are suggested by an unnecessary guidance because of delay of the operator's operation can be made invalid, thus preventing unnecessary operations.

While embodiment 6 employs guidance table data 143 in which the respective operation contents are outputted in the order operated so that the order at which the operation contents are to be operated can be determined by checking that order, alternate embodiments can include an operator support system which employs guidance table data 143 having data indicating the order at which the operation contents are to be operated so that the sequence of operation contents can be checked by the data.

While embodiment 6 is shown as having neither enforcement determining unit 233 nor out-of-range determining unit 234 or 243$a$ shown in embodiments 3 to 5, alternate embodiments can include operator support systems including combinations of these functions.

While embodiment 6 is shown as employing the guidance table data 143 having time data representing a time limit for timing determination, alternate embodiments can include an operator support system in which time data having a time range in which the operation is to be started is provided, and an operator support system having an alarm time used for generating an alarm when the operation is not completed by a predetermined time.

While embodiments 1 to 6 are shown as employing the display device 16 (shown in FIG. 1) as a display, alternate embodiments of the invention as contemplated herein can include, as a display, a CRT, a large screen display device, a flat display, a head-mount display, a portable display device or an audio device or other means of communicating with the operator.

While embodiments 1 to 6 are shown as employing the touch panel provided integrally with the display 16 as the input device 20 (shown in FIG. 1), alternate embodiments of the invention as contemplated herein can include, as a touch panel, a turn or push button switch mounted on a main control panel, a mouse input device, a track ball input device or a keyboard or other type of input device.

While embodiments 1 to 6 are shown wherein the operation selection method of the selection operating unit 23 (shown in FIGS. 3, 7, 10, 14, 17 or 20) includes selection of the control object equipment and selection of the operation contents, alternate embodiments of the invention can include an operator support system wherein an operation selection method includes a single operation achieved by operating a control switch or a button.

While embodiments 1 to 6 are shown as employing an operation completion flag of the guidance table data 143 (shown in FIGS. 1, 3, 7, 10, 14, 17 or 20) to record in the guidance table data 143 that the processing corresponding to the operation contents thereof is completed, alternate embodiments of the invention can incorporate an operator support system wherein the guidance corresponding to the operation contents on which processing is completed is erased from the guidance table data 143.

These embodiments of the invention having the above-described structure have the following advantages.

1. In the operator support system provided in the first aspect of the invention, the operation evaluation unit compares the data representing the guidance operation contents with the data representing the operation contents output by the operation selecting unit, and evaluates that the operation contents selected by the operator are correct when correspondence is obtained between these data. Accordingly, the output of an erroneous operation to the plant is prevented, and consequently a safe operator support system which is free from an operator's operation error is provided.

2. In the operator support system provided in the second aspect of the invention, the operation evaluation unit compares the data representing each of the operation contents recorded in the guidance table with the data representing the operation contents output by the operation selecting unit, and evaluates that the operation contents selected by the operator are correct when it determines, from coincidence in a particular portion between these data, that correspondence is obtained between these data. Accordingly, the output of an erroneous operation to the plant is prevented, and consequently a safe operator support system which is free from an operator's operation error is provided.

3. In the operator support system provided in the third aspect of the invention, the operation evaluation unit determines, from coincidence in at least both the code representing the equipment to be operated and the code representing the operation contents conducted on the equipment, that correspondence is obtained between the data representing the operation contents output by the operation guidance generating unit and the data representing the operation contents output by the operation selecting unit. Accordingly, the output of an erroneous operation to the plant is prevented, and consequently a safe operator support system which is free from an operator's operation error is provided.

4. In the operator support system provided in the fourth aspect of the invention, the operation evaluation unit determines, from at least both the code representing the equipment to be operated and the set value set for the equipment, that correspondence is obtained between the data representing the operation contents output by the operation guidance generating unit and the data representing the operation contents output by the operation selecting unit. Accordingly, the output of an erroneous operation to be conducted on an analog device to the plant is prevented, and consequently a safe operator support system which is free from an operator's operation error is provided.

5. In the operator support system provided in the fifth aspect of the invention, the operation evaluation unit evaluates that the operation contents selected by the operator are incorrect when it determines that there is no correspondence between the data representing each of the operation contents output by the operation guidance generating unit and the data representing the operation contents output by the operation selecting unit, and outputs an operator error and suspends sending of the operation contents selected by the operator as control output. Accordingly, the output of an erroneous operation to the plant is prevented, and consequently a safe operator support system which is free from an operator's operation error is provided. Further, even if the operator performs an operation error, since the operator can judge the contents of that operation error by the display thereof, he or she can select a correct operation.

6. In the operator support system provided in the sixth aspect of the invention, when the data representing enforcement or non-enforcement, output by the operation selecting unit, indicates enforcement, the running operation evaluating unit sends the operation contents output by the operation selecting unit as control output prior to the evaluation of the operation contents selected by the operator. Consequently, the operation which is not suggested by the operation guidance can be enforced by the operator's judgment.

7. In the operator support system provided in the seventh aspect of the invention, the running operation evaluating unit sends the operation contents output by the operation selecting unit as control output prior to the evaluation of the operation contents selected by the operator when it determines that the operation contents output by the operation selecting unit are out of the running operation evaluation range. Consequently, the operation that cannot be evaluated by the guidance can be output without providing the enforcement mode.

8. In the operator support system provided in the eighth aspect of the invention, the operation evaluation unit determines whether or not correspondence is obtained between the data representing the operation contents of the guidance table output by the operation guidance generating unit and the data representing the operation contents output by the operation selecting unit, and records completion of operation on the data representing the operation contents in the guidance table corresponding to the operation contents evaluated and output by the operation evaluation unit as the correct operation contents. It is thus possible to prevent re-operation of the already completed operation.

9. In the operator support system provided in the ninth aspect of the invention, the running operation evaluating unit compares the data representing the operation contents to be processed subsequently in the data representing the operation contents listed in the guidance table with the data representing the operation contents output by the operation selecting unit to determine whether or not correspondence is obtained between said data. It is thus possible to prevent an operation error due to a procedure error.

10. In the operator support system provided in the tenth aspect of the invention, the running operation evaluating unit evaluates that the operation contents selected by the operator are an erroneous operation when correspondence is obtained with the data representing the operation contents output by the operation selecting unit in a period of time other than the period of time represented by the time data of the guidance table, and outputs an operation error. Thus, the operation contents operated by the operator at an incorrect timing can be made invalid, thus enabling prevention of unnecessary operation.

The invention has been described with respect to certain preferred embodiments. Various modifications and additions within the spirit of the invention will occur to those of skill in the art. Accordingly, the scope of the invention is limited solely by the following claims.

What is claimed is:

1. An operator support system for plant equipment, comprising:

an operation guidance generating unit for outputting, from monitoring data, operation contents in the form of guidance as to operations to be performed by an operator;

an operation selecting unit for outputting operation contents selected by the operator according to said guidance; and an operation evaluation unit for comparing data representing the operation contents of said guidance with data representing the operation contents outputted by said operation selecting unit as selected by the operator and for evaluating that the operation contents selected by the operator are correct when correspondence is obtained between said data representing the operation contents of said guidance and said data representing the operation contents outputted by said operation selection unit as selected by the operator, and for sending the operation contents selected by the operator as control output when said operation contents are evaluated as correct based on said correspondence.

2. The operator support system according to claim 1, wherein said data representing the operation contents has a code representing equipment to be operated and a code representing an operation contents to be conducted on said equipment, and wherein said operation evaluation unit determines, from coincidence between at least both said codes, that correspondence is obtained between the data representing the operation contents output by said operation guidance generating unit and the data representing the operation contents output by said operation selecting unit.

3. The operator support system according to claim 1, wherein said data representing the operation contents has a code representing an equipment to be operated and a code representing a set value to be set on said equipment, and wherein said operation evaluation unit determines, from at least both said codes, that correspondence is obtained between the data representing the operation contents output by said operation guidance generating unit and the data representing the operation contents output by said operation selecting unit.

4. The operator support system according to claim 1, wherein said operation evaluation unit evaluates that the operation contents selected by the operator are incorrect when said operation evaluation unit determines that there is no correspondence between the data representing each of the operation contents output by said operation guidance generating unit and the data representing the operation contents output by said operation selecting unit, and outputs an operator error and suspends sending of the operation contents as control output.

5. The operator support system according to claim 1, wherein the data representing the operation contents output by said operation selecting unit has data representing enforcement or non-enforcement, and wherein said operation evaluation unit sends the operation contents output by said operation selecting unit as control output prior to evaluation of the operation contents selected by the operator when said data represents enforcement.

6. The operator support system according to claim 1, wherein said running operation evaluating unit sends the operation contents output by said operation selecting unit as control output prior to evaluation of the operation contents selected by the operator when said running operation evaluating unit determines that the operation contents output by said operation selecting unit are out of the running operation evaluation range.

7. An operator support system for plant equipment, comprising:
    an operation guidance generating unit for outputting, from monitoring data, a plurality of operation contents to be performed by an operator, as a guidance table;
    an operation selecting unit for outputting operation contents selected by the operator according to said guidance table; and
    an operation evaluation unit for comparing data representing each of the operation contents recorded in said guidance table with data representing the operation contents outputted by said operation selecting unit as selected by the operator, for evaluating that the operation contents selected by the operator are correct when said operation evaluation unit determines, from coincidence in a particular portion of said data, that correspondence is obtained between said data representing the operation contents recorded in said guidance table and said data representing the operation contents outputted by said operation selecting unit as selected by the operator, and for sending the operation contents selected by the operator as control output.

8. The operator support system according to claim 7, wherein said data representing the operation contents has a code representing equipment to be operated and a code representing an operation contents to be conducted on said equipment, and wherein said operation evaluation unit determines, from coincidence between at least both said codes, that correspondence is obtained between the data representing the operation contents output by said operation guidance generating unit and the data representing the operation contents output by said operation selecting unit.

9. The operator support system according to claim 7, wherein said data representing the operation contents has a code representing an equipment to be operated and a code representing a set value to be set on said equipment, and wherein said operation evaluation unit determines, from at least both said codes, that correspondence is obtained between the data representing the operation contents output by said operation guidance generating unit and the data representing the operation contents output by said operation selecting unit.

10. The operator support system according to claim 7, wherein said operation evaluation unit evaluates that the operation contents selected by the operator are incorrect when said operation evaluation unit determines that there is no correspondence between the data representing each of the operation contents output by said operation guidance generating unit and the data representing the operation contents output by said operation selecting unit, and outputs an operator error and suspends sending of the operation contents as control output.

11. The operator support system according to claim 7, wherein the data representing the operation contents output by said operation selecting unit has data representing enforcement or non-enforcement, and wherein said operation evaluation unit sends the operation contents output by said operation selecting unit as control output prior to evaluation of the operation contents selected by the operator when said data represents enforcement.

12. The operator support system according to claim 7, wherein said running operation evaluating unit sends the operation contents output by said operation selecting unit as control output prior to evaluation of the operation contents selected by the operator when said running operation evaluating unit determines that the operation contents output by said operation selecting unit are out of the running operation evaluation range.

13. The operator support system according to claim 7, wherein said guidance table output by said operation guidance generating unit contains data representing a plurality of operation contents and containing operation procedures, and wherein said operation evaluation unit determines whether or not correspondence is obtained between the data representing said plurality of operation contents and the data representing the operation contents output by said operation selecting unit, and records completion of operation on the data representing the operation contents in said guidance table corresponding to the operation contents evaluated and output by said operation evaluation unit as the correct operation contents.

14. The operator support system according to claim 7, wherein said running operation evaluating unit determines whether or not correspondence is obtained between the data representing the operation contents to be processed subsequently in the data representing the operation contents listed in said guidance table and the data representing the operation contents output by said operation selecting unit by comparing said two data.

15. The operator support system according to claim 7, wherein the data representing each of the operation contents in said guidance table output by said operation guidance generating unit has time data for determining a period of time when the operation represented by said time data is to be conducted, and wherein said running operation evaluating unit evaluates that the operation contents selected by the operator are an erroneous operation when correspondence is obtained between the data represented by the operation contents and the data representing the operation contents output by said operation selecting unit in a period of time other than the period of time represented by said time data, and outputs an operation error.

16. An operator support system for enabling an operator to controllable a monitor and control object run by a computer program, said system comprising:
    a data collecting unit for collecting monitoring data from said controllable object;
    an operation guidance generating unit for generating operation contents based on said monitoring data to be utilized by the operator as guidance;
    an output interface connected to said operation guidance generating unit;
    an output device connected to said output interface for informing the operator of said guidance data;
    an input device for allowing the operator to input controllable data on said monitor and control object based on said guidance data;

an input interface connected to said input device;

an operation selecting unit connected to said input interface for outputting data representing operation contents selected by the operator from the input monitor control data; and a running operation evaluating unit for comparing said guidance data from said operation guidance generating unit with the data from said operation selecting unit, representing the operation contents selected by the operator, for evaluating that the operation contents selected by the operator are correct when correspondence is obtained between the two data consisting of said guidance data and said data from said operation selecting unit, and for sending the data selected by the operator to said controllable data as control output, and wherein the data selected by the operator is outputted to said output device through said output interface and presented to the operator.

17. The operator support system according to claim 16, wherein said running operation evaluating unit evaluates that the operation contents selected by the operator are incorrect when there is no correspondence between said two data in said comparison, and generates an operator error and prohibits output of the data selected by the operator to said controllable object.

18. The operator support system according to claim 16, wherein when data representing enforcement is input to said input device by the operator, said running operation evaluating unit outputs the data representing the operation contents selected by the operator to said controllable object as control output prior to evaluation of the operation contents selected by the operator.

19. The operator support system according to claim 16, wherein said operation guidance generating unit is configured with a guidance table the output of which contains data representing a plurality of operation contents and operation procedures, and wherein said operation evaluation unit determines whether or not correspondence is obtained between the data representing said plurality of operation contents and the data representing the operation contents output by said operation selecting unit, and records completion of operation on the data representing the operation contents in said guidance table corresponding to the operation contents evaluated and output by said operation evaluation unit as the correct operation contents.

20. The operator support system according to claim 16, wherein said controllable object is an analog device, and wherein said operation evaluation unit has a range when it compares said guidance data with said operation contents data selected by the operator, and evaluates the correctness of the operation when said operation contents data selected by the operator is approaching the data indicated by the guidance.

* * * * *